US010573178B2

(12) United States Patent
Nascimento et al.

(10) Patent No.: US 10,573,178 B2
(45) Date of Patent: Feb. 25, 2020

(54) SYSTEMS AND METHODS FOR TRACKING AND FAULT DETECTION, FOR EXAMPLE AMONG AUTONOMOUS VEHICLES, IN A NETWORK OF MOVING THINGS

(71) Applicant: Veniam, Inc., Mountain View, CA (US)

(72) Inventors: Dário Nascimento, Lisbon (PT); Roy Russell, Cambridge, MA (US)

(73) Assignee: VENIAM, INC., Mountain View, CA (US)

(*) Notice: Subject to any disclaimer, the term of this patent is extended or adjusted under 35 U.S.C. 154(b) by 200 days.

(21) Appl. No.: 15/610,951

(22) Filed: Jun. 1, 2017

(65) Prior Publication Data

US 2018/0122237 A1 May 3, 2018

Related U.S. Application Data

(60) Provisional application No. 62/415,268, filed on Oct. 31, 2016.

(51) Int. Cl.
*G08G 1/0968* (2006.01)
*H04L 29/08* (2006.01)
*G08G 1/0967* (2006.01)
*G08G 1/09* (2006.01)

(52) U.S. Cl.
CPC ....... *G08G 1/096827* (2013.01); *H04L 67/12* (2013.01)

(58) Field of Classification Search
CPC .......... G08G 1/096827; G08G 1/0965; G08G 1/0133; G08G 5/0069; G08G 5/0013; G08G 1/096783; G08G 1/127; G08G 5/045; G08G 1/162; G08G 1/096758; G08G 1/005; G08G 1/20; G08G 1/164; G08G 1/096775; G08G 1/0112; G08G 1/0116; G08G 1/096844; G08G 1/0141; G08G 5/0026; G08G 1/096716; G08G 1/096791; G08G 5/0039; G08G 5/0082; H04W 4/30; H04L 67/12
USPC ....................................................... 701/117
See application file for complete search history.

(56) References Cited

U.S. PATENT DOCUMENTS

2017/0069209 A1* 3/2017 Beaurepaire ..... G08G 1/096805
2019/0090174 A1 3/2019 Rocci et al.

* cited by examiner

*Primary Examiner* — Brian P Sweeney
(74) *Attorney, Agent, or Firm* — McAndrews, Held & Malloy, Ltd.

(57) ABSTRACT

Systems and methods for achieving road action consensus in a network of moving things. As non-limiting examples, various aspects of this disclosure provide systems and methods for achieving road action consensus in vehicles (e.g., autonomous vehicles, manually controlled vehicles, etc.) of a network of moving things.

28 Claims, 16 Drawing Sheets

SYSTEMS AND METHODS FOR TRACKING AND FAULT DETECTION, FOR EXAMPLE AMONG AUTONOMOUS VEHICLES, IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/415,268, filed on Oct. 31, 2016, and titled "Systems and Methods for Tracking and Fault Detection, for Example Among Autonomous Vehicles, in a Network of Moving Things," which is hereby incorporated herein by reference in its entirety.

The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current networks of moving things, for example networks comprising autonomous vehicles, are unable to adequately support vehicle control, monitoring, and/or the recreation of vehicle events. As a non-limiting example, current networks of moving things are unable to adequately support a network comprising a complex array of both moving and static nodes, for example associated with autonomous and/or manually controlled vehicles. Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
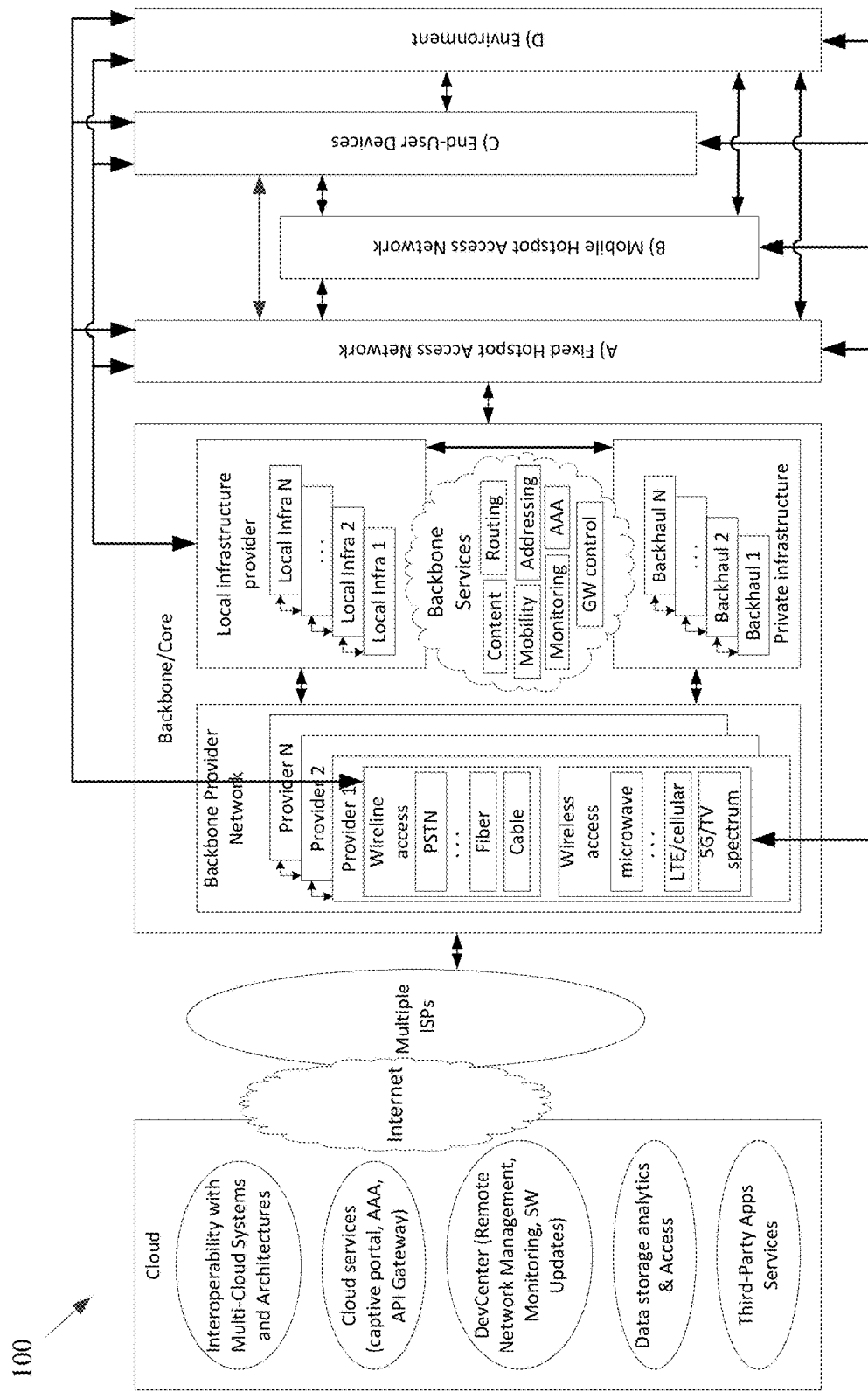
FIG. 1 shows a block diagram of a communication network, in accordance with various aspects of this disclosure.

Various aspects of this disclosure provide systems and methods for controlling, tracking, and analyzing vehicle travel in a network of moving things. As non-limiting examples, various aspects of this disclosure provide systems and methods for controlling vehicle travel (e.g., of autonomous vehicles, manually controlled vehicles, etc.), monitoring vehicle travel, and recreating vehicle travel events, in a networking of moving things.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set $\{(x), (y), (x, y)\}$. That is, "x and/or y" means "one or both of x and y." As another example, "x, y, and/or z" means any element of the seven-element set $\{(x), (y), (z), (x, y), (x, z), (y, z), (x, y, z)\}$. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, Fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the Cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a Cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or Fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, networks and/or network components 200, 300, 400, 500-570, 600, 700, 800, 900, 1000, 1100, 1200, 1300, and 1400, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-Cloud systems and architectures. Another example component (e.g., a Cloud service component) may, for example, provide various Cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
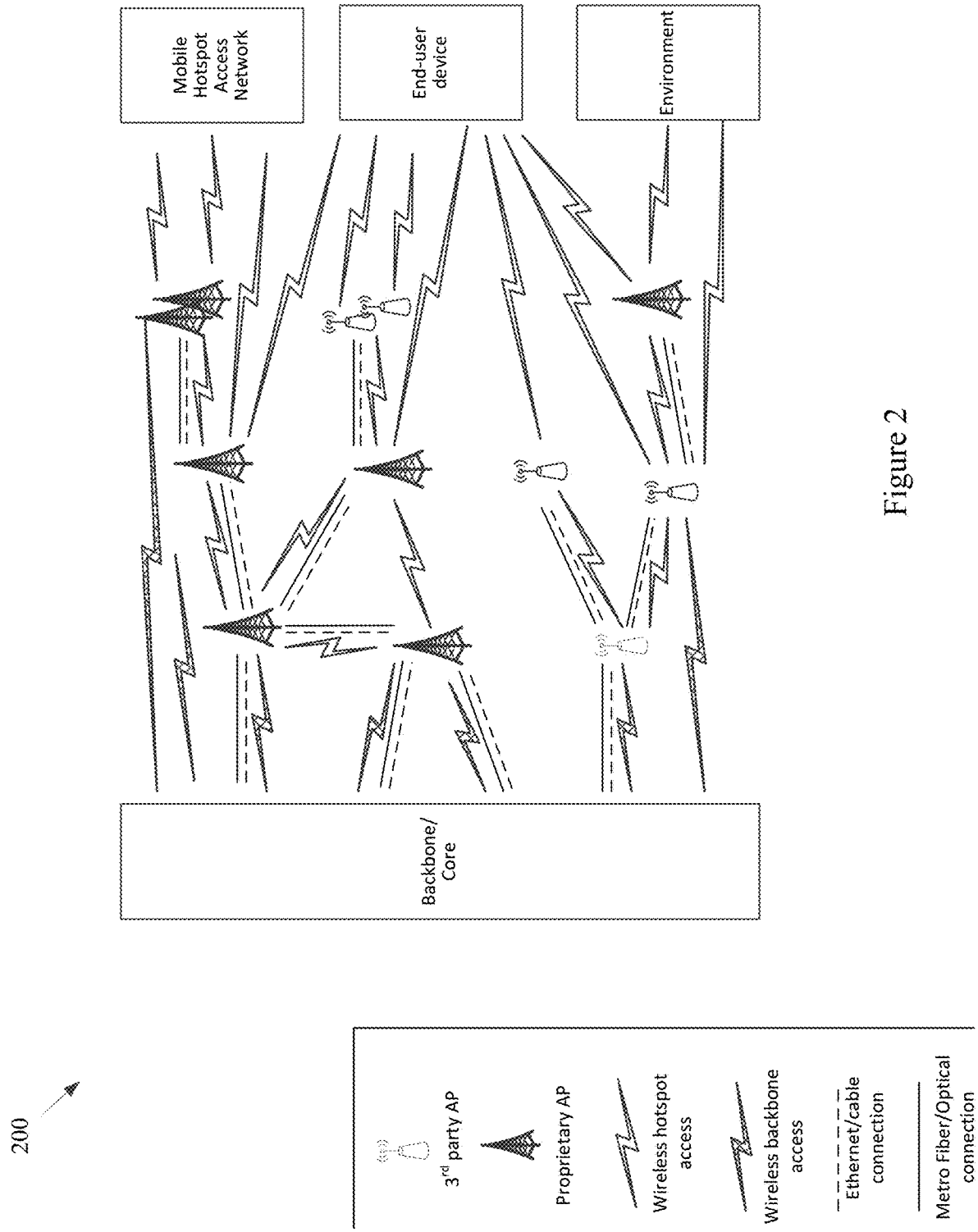
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, networks and/or network components 100, 300, 400, 500-570, 600, 700, 800, 900, 1000, 1100, 1200, 1300, and 1400, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
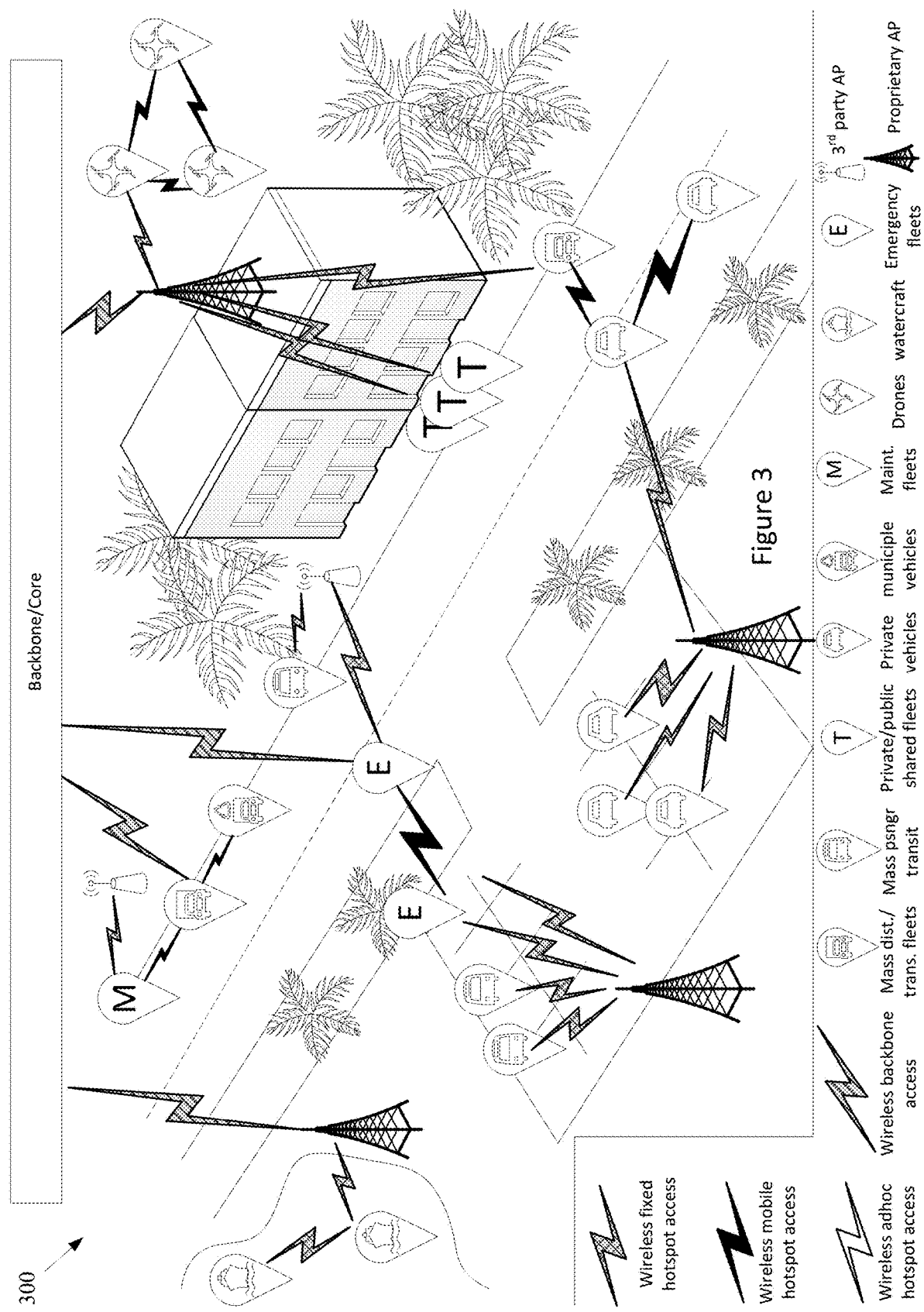
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, networks and/or network components 100, 200, 400, 500-570, 600, 700, 800, 900, 1000, 1100, 1200, 1300, and 1400, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
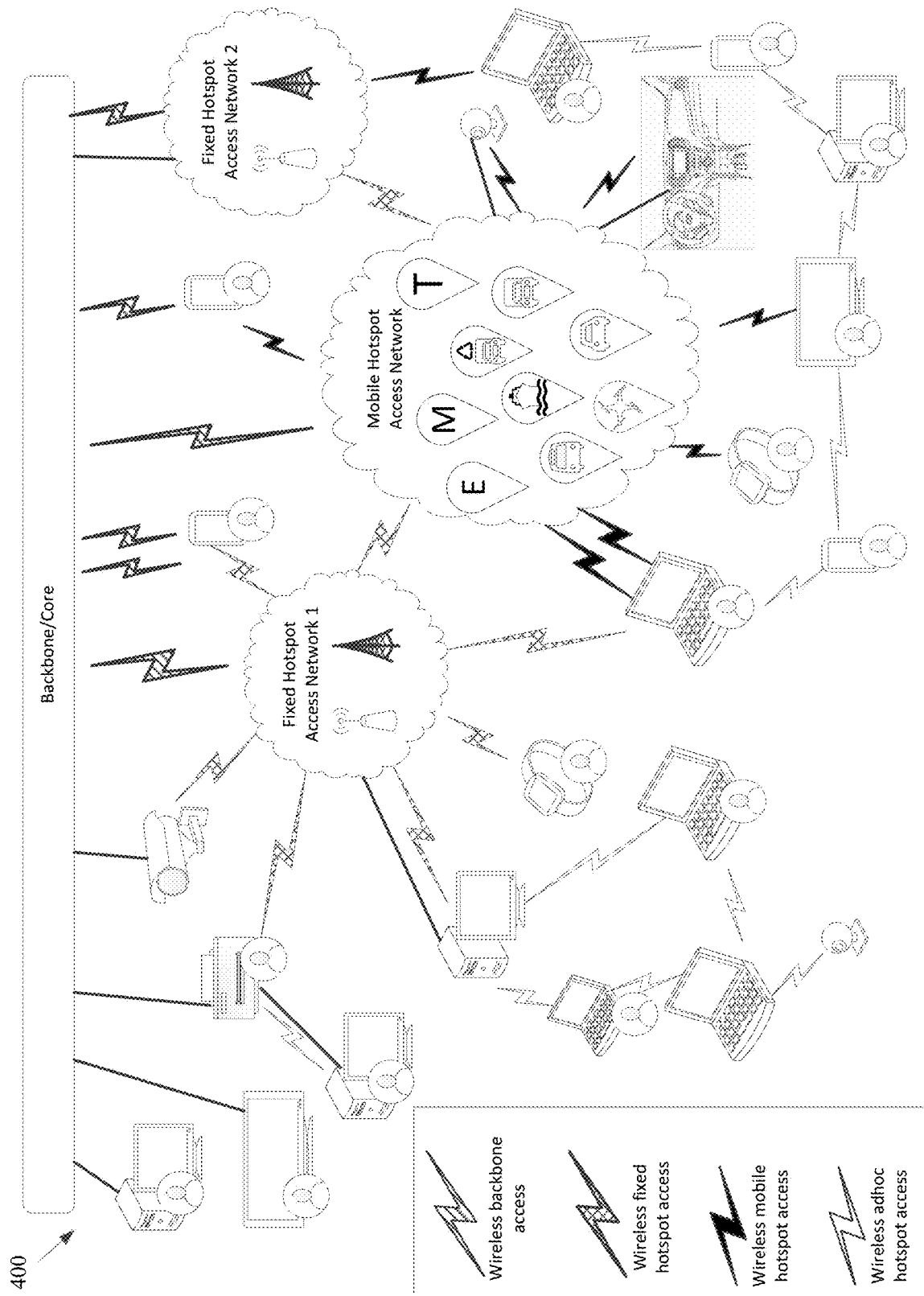
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, networks and/or network components 100, 200, 300, 500-570, 600, 700, 800, 900, 1000, 1100, 1200, 1300, and 1400, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
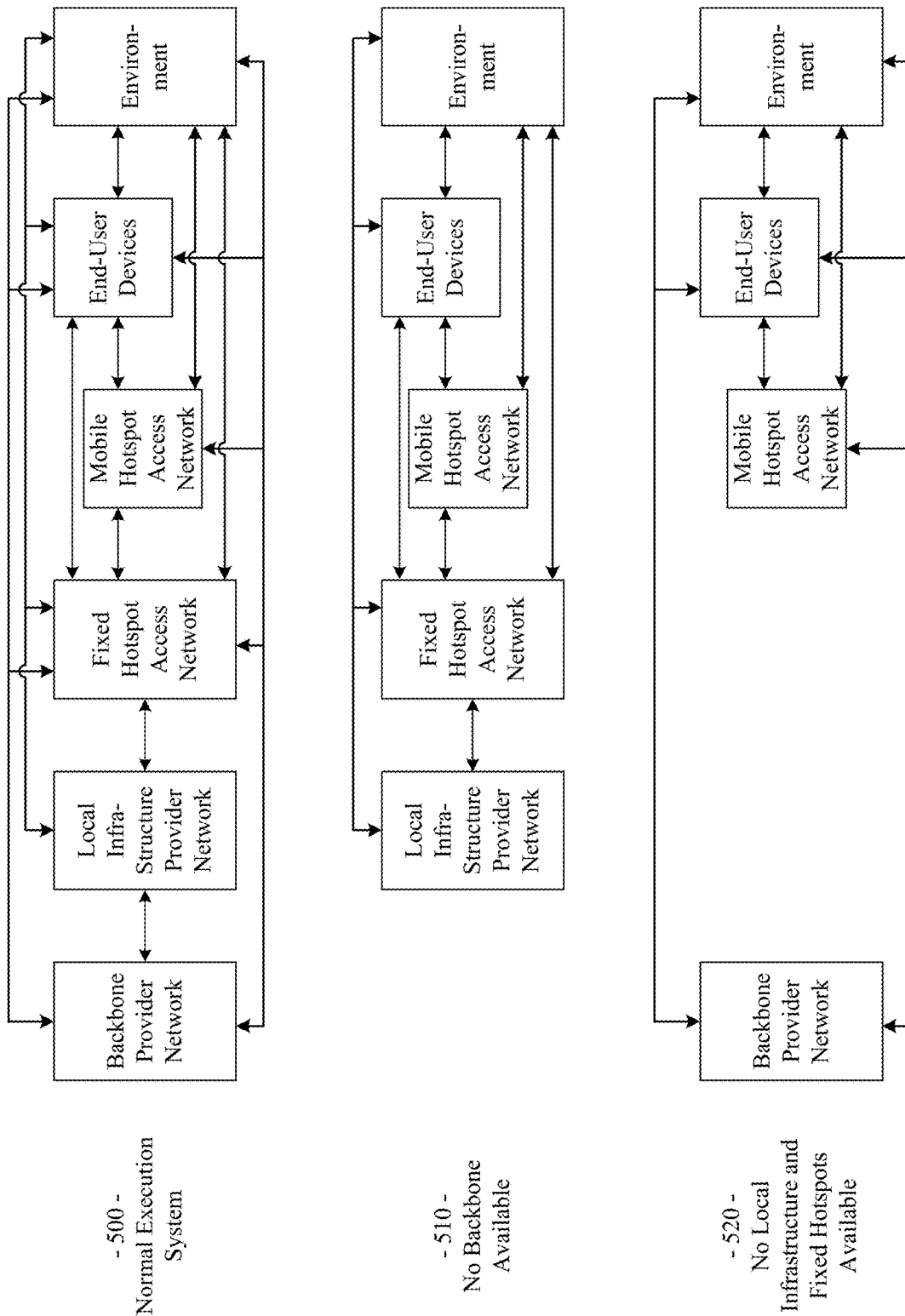
FIGS. 5A-5C show a plurality of network configurations illustrating the flexibility and/or and resiliency of a communication network, in accordance with various aspects of this disclosure.
Figure 5B:
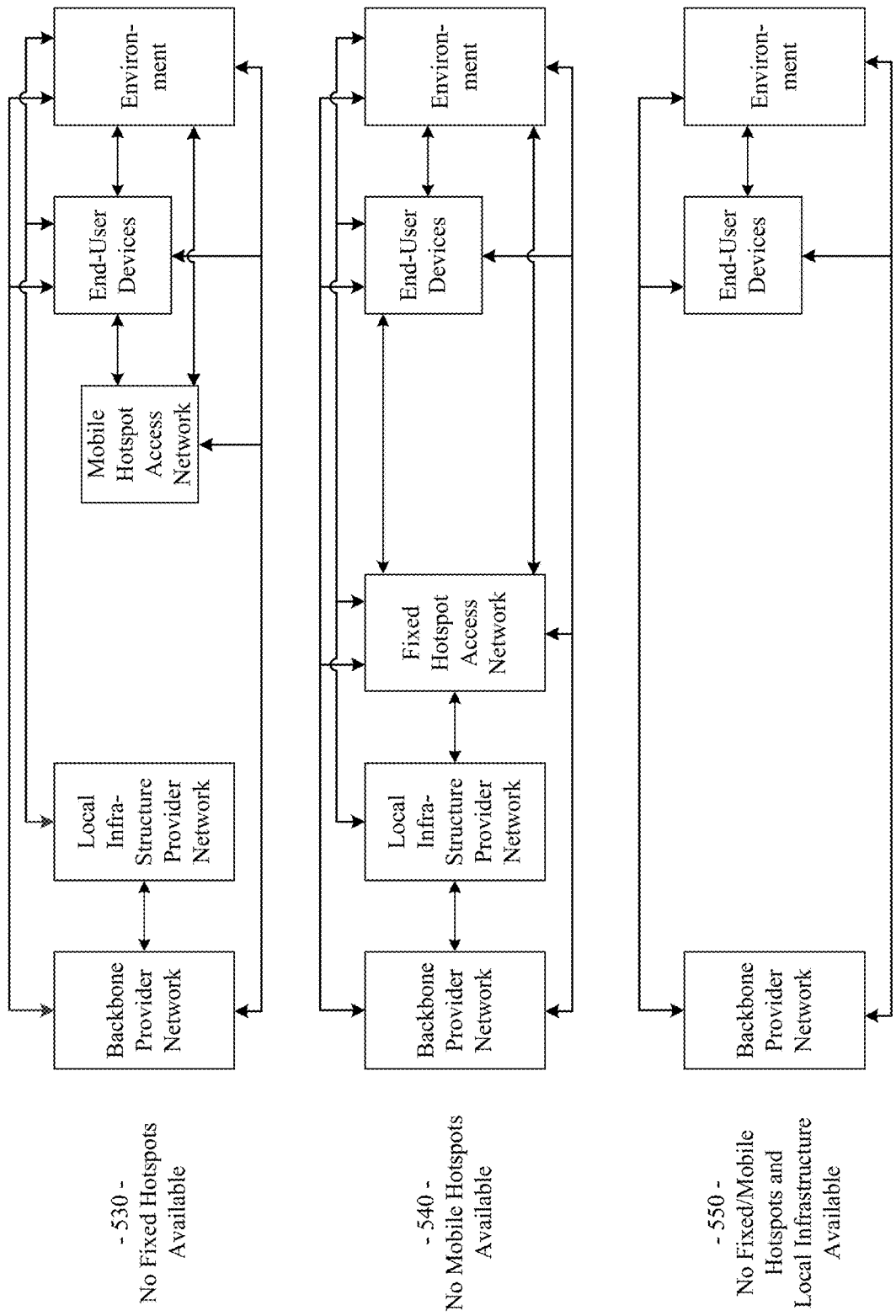
Figure 5C:
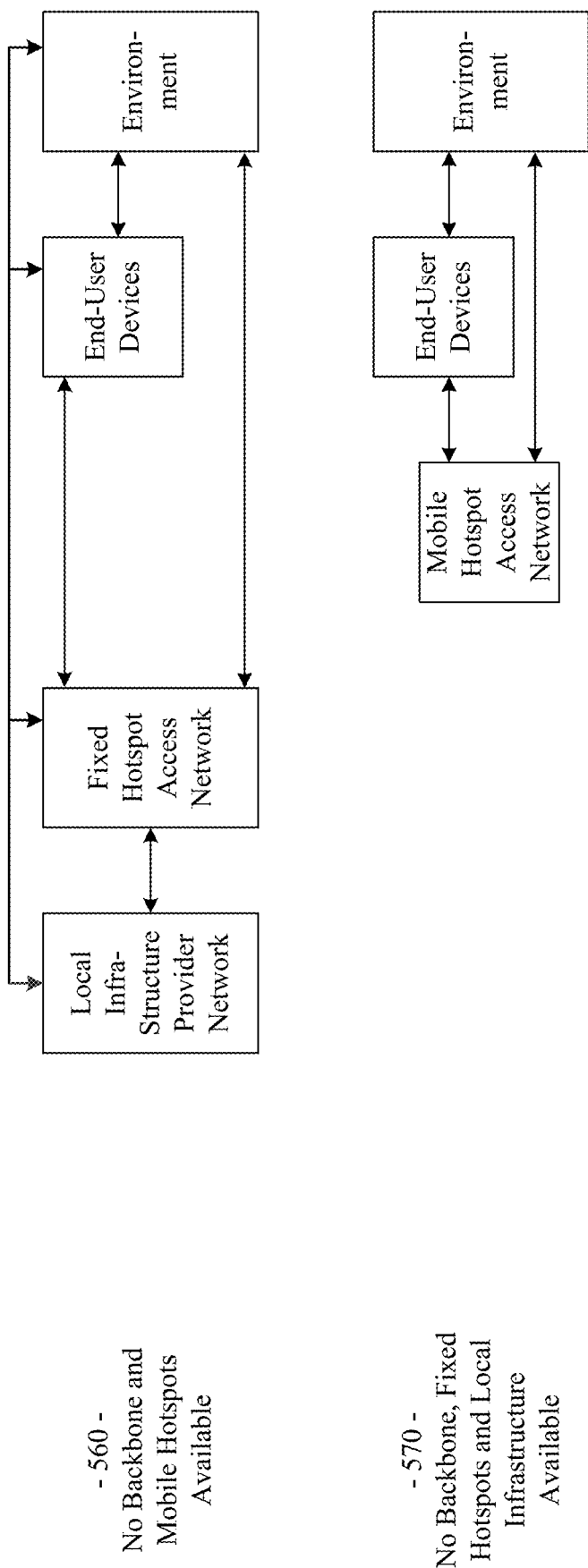

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, networks and/or network components 100, 200, 300, 400, 600, 700, 800, 900, 1000, 1100, 1200, 1300, and 1400, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of Cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
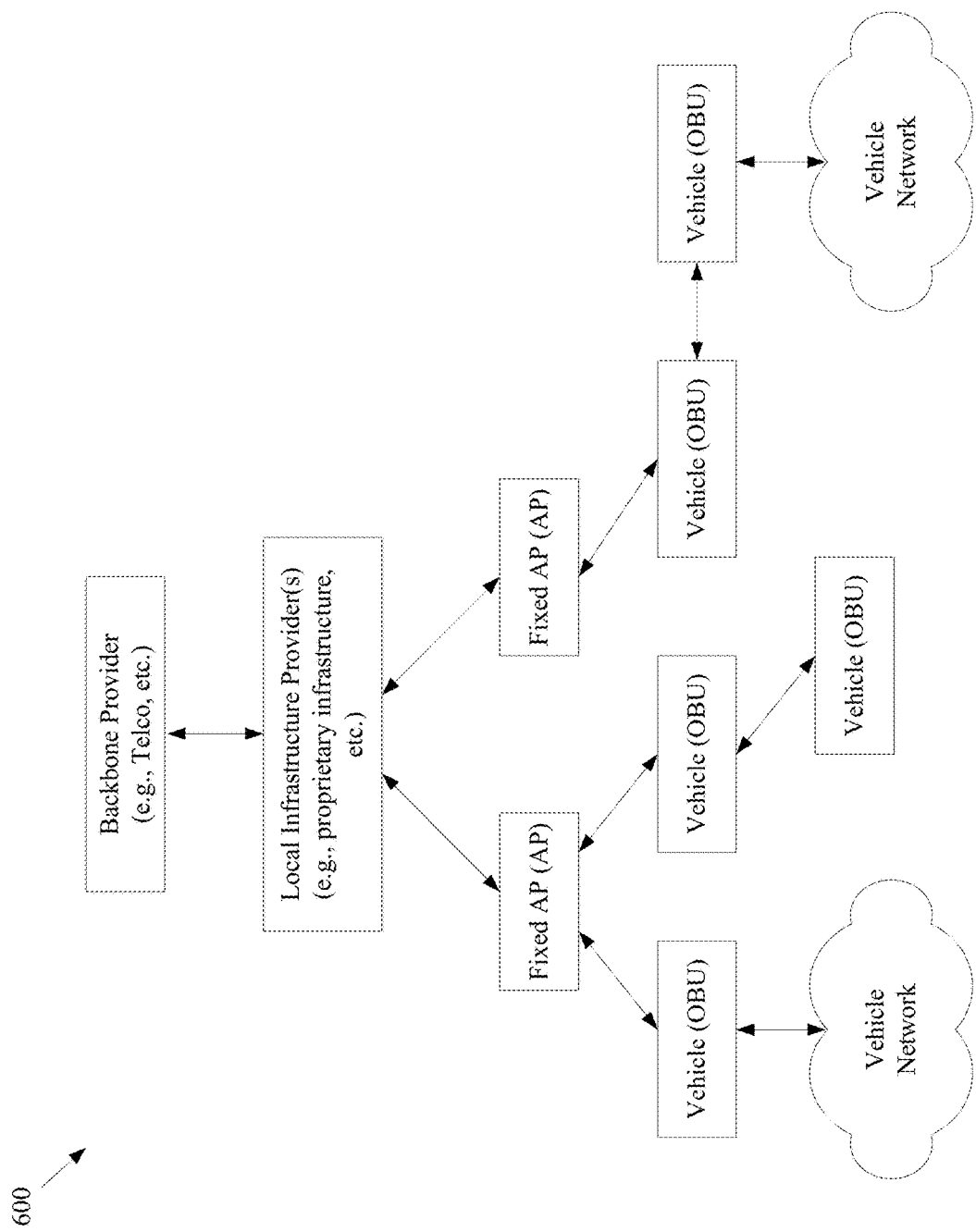
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, networks and/or network components 100, 200, 300, 400, 500-570, 700, 800, 900, 1000, 1100, 1200, 1300, and 1400, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Figure 7:
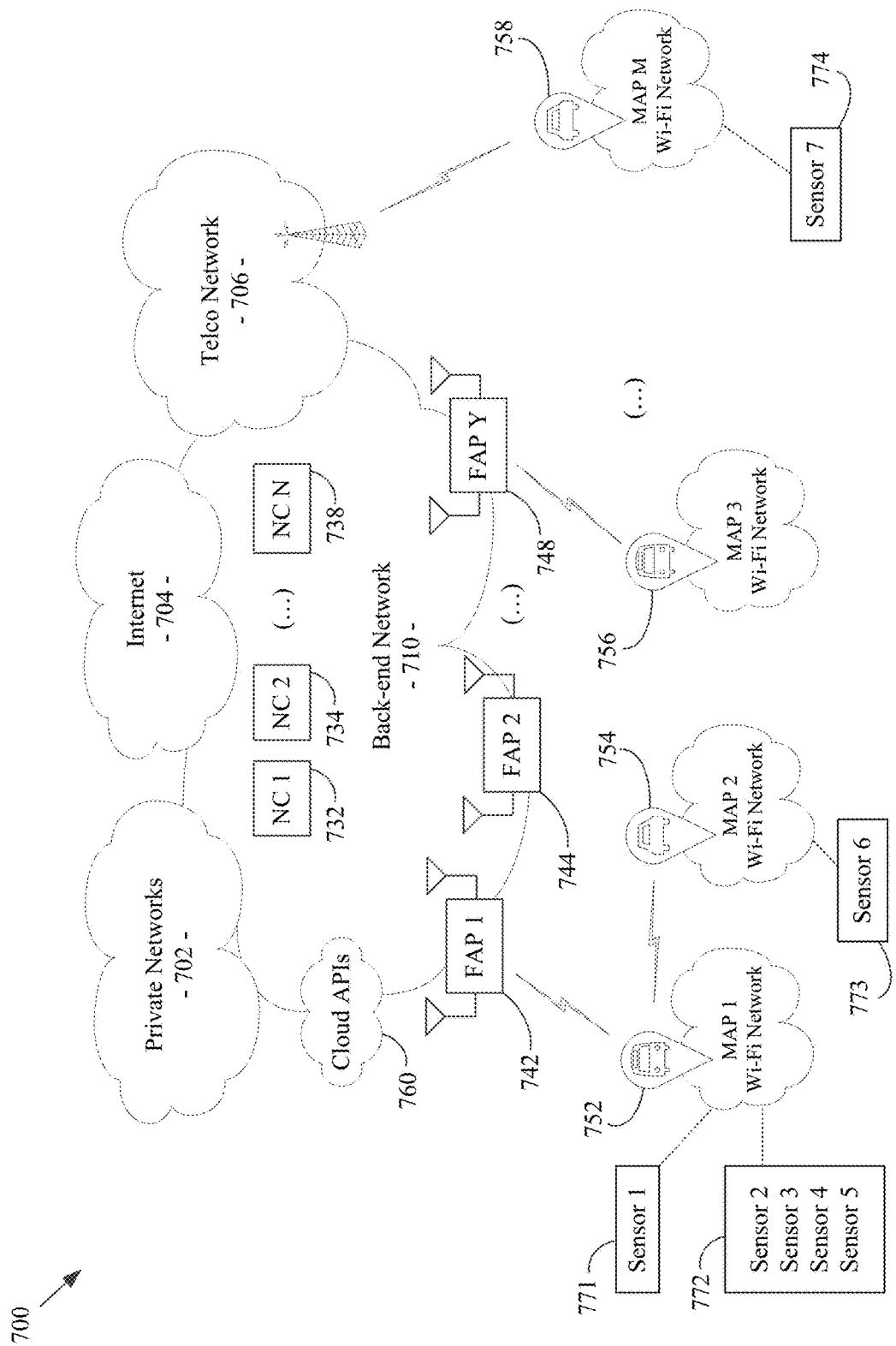
FIG. 7 shows a block diagram of an example communication network, in accordance with various aspects of the present disclosure.

FIG. 7 shows still another block diagram of an example communication network 700, in accordance with various aspects of the present disclosure. The example network 700 may, for example, share any or all characteristics with the other example methods, networks and/or network components 100, 200, 300, 400, 500-570, 600, 800, 900, 1000, 1100, 1200, 1300, and 1400, discussed herein. Notably, the example network 700 shows a plurality of vehicles (or Mobile APs, or MAPs, or OBUs) 752, 754, 756, and 758, each communicatively coupled to a Fixed AP (or RSU) 742, 744, and 748 and/or a cellular network 706, where each Mobile AP may provide network access to a vehicle network (e.g., comprising other vehicles or vehicle networks, user devices, sensor devices, etc.), for example a Wi-Fi network to which end user devices may connect, with which communication with sensors may be performed, etc. The example network 700 may also, for example, comprise a plurality of Network Controllers 732, 734, and 738. The example network 700 may also, for example, comprise any of a variety of interconnected networks (e.g., Private Networks 702, the Internet 704, Telecommunication Networks 706, etc.). One or more servers of the Cloud may, for example, be accessible via Cloud APIs 760.

The Mobile APs 752, 754, 756, and 758 may, for example, be communicatively coupled to various sensors (e.g., always, as the Mobile APs travel within range of such sensors, etc.). For example, in the example scenario shown in FIG. 7, a first MAP 752 is communicatively coupled to a first sensor 771 (e.g., Sensor 1) and a set of sensors 772 (e.g., Sensor 2, Sensor 3, Sensor 4, and Sensor 5), which may for example be co-located; a second MAP 754 is communicatively coupled to a sixth sensor 773; and an $M^{th}$ MAP 758 is communicatively coupled to a seventh sensor 774. The Mobile APs may, for example move in and out of communication range of the various sensors. The Mobile APs may, for example when in-range of such sensors, gather information from such sensors in a power-efficient and network-efficient manner, many examples of which are provided herein.

Due to the frequent interactions between vehicles in dense urban environments, it may, in various scenarios, be beneficial to track who (or what) is at fault when there is a crash, an unexpected event at a road intersection, a traffic jam, etc. Also, with the advent of autonomous vehicles, to avoid undesirable situations (e.g., crashes, accidents in general, traffic blockages, etc.), it may be beneficial to ensure that vehicle actions and interactions are well coordinated and agreed in advance.

Generally, the critical actions or events are performed by vehicles that are considered trusted in the network. Thus, in accordance with various aspects of this disclosure, there are provided centralized and secure systems to perform the vehicle decisions and to enforce (or implement) such decisions in the network. Herein, when a decision is made or taken, such decision may, for example, refer to a plan that includes a trajectory to implement (e.g., during a particular period or window of time, etc.) and/or the implementation of such trajectory.

When operating in urban environments, agreements regarding road (or travel) actions to take may need to be made quickly and/or locally (e.g., by an electronic system of the vehicle performing the action, by a neighbor node of the vehicle performing the action, etc.). In various implementation scenarios, it might not be practical to contact and negotiate with a centralized entity. Accordingly, in various implementation, the vehicles, Fixed APs, other sources of information, etc., that can be connected to the vehicular network may be implemented with enough intelligence to allow vehicles to take and agree, in real-time and in a distributed way, on actions that vehicles should take that can influence their travel (or trajectory or path or flight, etc.).

Those distributed actions may, for example, be driven by the local context of the vehicles, and may also be driven by the context required to globally optimize some action on the road (e.g., level of reduced congestion, less traveling distance, less time spend in traffic jams, less fuel consumption and/or pollution emission, etc.). For example, each vehicle may be periodically advertised by (or provided with) global context that may influence its decision, such as expected time to arrive at the destination if the vehicle turns right in the next road intersection, the number of traffic lights if the vehicle turns left in the next road intersection, etc.

Various aspects of the present disclosure also provide for continuously improving and/or optimizing the action determination (e.g., improving or optimizing algorithms, methods, metrics, etc.). For example, by comparing the action(s) against the results (or outcomes) of the action(s) (e.g., collision avoidance, congestion level, traveling distance amount, time spent in traffic jams, emissions produced, energy utilized, quality of user experience, time to reach emergency locations, time to remedy traffic obstructions, amount of still time or slowly-moving time, etc.), good decisions may be reinforced (e.g., by algorithm factor weighting, etc.) and bad decisions may be identified for improvement, analysis, and learning.

Various aspects of the present disclosure additionally provide for the storage of the decisions made and/or implemented, and for correlating data from multiple information sources (e.g., from multiple vehicles, from on-vehicle or off-vehicle sensors, from intersection or vehicle cameras, from audio sensors, from GPS and/or other positioning systems, from autonomous vehicle control systems, from vehicle OBD systems, from user electronic devices, etc.). Such stored and/or correlated data may then be made available (e.g., via APIs, etc.) for analysis, for example to determine an individual, vehicle, or other entity that was at fault in a collision. For example, the decisions and/or implemented decisions may be backtracked to determine the sequence of events leading to an accident. Such knowledge may then, for example, be utilized by public safety organizations, insurance companies, courts of law, decision algorithm developers, autonomous vehicle manufacturers, etc.

In an example implementation a blockchain-based approach may be utilized to allow the distributed agreement of actions between vehicles, where vehicles (or actions) may be trusted by each other. However, in order to trust a vehicle, a blockchain-based approach may include solving a problem (e.g., a cryptopuzzle hash, etc.), which might not effectively fit with the Internet of Things (IoT) where, for example, the CPU constraints or latency requirements are tight, for example requiring a delay, which may for example exceed many minutes, for most interactions which cannot effectively deal with the substantial mobility and the dynamics of vehicular environments, for example for a plan for traveling through an intersection. Therefore, in accordance with various aspects of this disclosure, a solution to achieve a local and quick consensus between vehicles is provided, which has substantially lower latency, and/or has further agreements that make editing of the past information (e.g., information regarding actions taken, etc.) more difficult.

In accordance with various aspects of the present disclosure, a system and method are provided which are able to make and agree on plans (ahead of time) that nodes must follow in vehicular environments in the context of the Network of Moving Things. An agreement may, for example, be made between parties (vehicles) which cannot be modified without agreement from both parties. Such an agreement may, for example, concern future actions that will be taken to avoid crashes.

In general, the system may be built on top of trusted entities that are able to reach a consensus on vehicle action(s) to take. Based on, for example, the priority/severity/impact/time to perform of a specific decision, this can be performed by a centralized entity that knows the entire network, distributed and in a peer-to-peer way by Mobile/Fixed APs that can see each other nearby, by an AP in a specific region that knows the entire context of that region, any combination thereof, etc. As discussed herein, the context of a particular scenario may determine the entity(s) that makes the decision.

The system may, for example, be driven by context that is carried by vehicles in a delay-tolerant fashion, as it can also include feedback or context acquired from other entities that are nearby the location of interest (e.g., cameras, radars, traffic lights, etc.) that are authenticated and trusted in the network ahead of time.

In accordance with various aspects of this disclosure, as trusted decisions are implemented (or deviated from), they generally cannot be rolled back (or modified). Various aspects of this disclosure provide for the sharing of information regarding such decision implementations or deviations (e.g., in a secure manner, in a delay tolerant manner, in a real-time emergency manner, etc.). In an example scenario, after a set of actions are implemented at an intersection and there are no mishaps, information regarding the actions taken may be propagated (e.g., to a Cloud server, distributed among multiple nodes of the network, etc.) in a delay tolerant manner. In another example scenario, after a set of actions are implemented that are associated with a collision, information regarding the actions may be immediately propagated to one or more destinations (e.g., to a Cloud server, to a public safety organization, to an autonomous vehicle fleet controller or manufacturer, etc.), for example utilizing a cellular communication link or other high-speed reliable link. In yet another example scenario, after a set of actions are implemented that result in a near collision (e.g., closer than allowed by safety distance thresholds, etc.), information regarding the actions may be quickly propagated (e.g., to an algorithm development organization, to a fleet controller, etc.) so that such information may be analyzed to proactively modify the decision algorithm before an accident occurs. Such storage, communication, and analysis of information may for example, assist with flight planning or vehicle travel planning, intersection management, autonomous vehicle management, etc.

Various aspects of the present disclosure provide a system and method that is thus able to detect unexpected vehicular context events and compare such events with the events as planned (or predicted) to determine what happened, to ascertain fault, to identify an opportunity for algorithm improvement, to identify faulty sensor or vehicle systems, to identify previously non-considered factors to add to the action determination algorithm. For example, in an example scenario, the system may identify a vehicle that deviated from the agreed-upon action plan, and then analyze information of (and around) such vehicle to determine a cause of the deviation (e.g., operator error, poor road conditions, detection of an obstacle that may have been unknown when the action determination was made, detection of another vehicle that is not behaving according to the travel plan, etc.).

In order to make decisions in advance that are driven, at least in part, by historical and/or predictable/deterministic context related to the vehicular environment/location in which the decision will be implemented, as well as to allow nodes to transport and share those decisions that can influence (or not) the future decisions taken by other nodes in the network, a system implemented in accordance with various aspects of this disclosure may be flexible and dynamic enough to distribute at least a portion of the intelligence and decision making capabilities among the different nodes to allow the timely making and implementing (or enforcement) of those decisions in the network when possible (or necessary or desirable).

For example, with regard to such decisions, in an example implementation all (or most) of the decisions may be linked with accurate timing information (e.g., utilizing clocks synchronized to GPS time), linked with information regarding neighbors nearby the location in which a decision will be (or was) implemented, vehicle trajectory information (e.g., speed, direction, vehicle actuator linear or rotary position, etc.), etc. The decisions may, for example, be influenced by information received from any of a variety of sources (e.g., from Mobile APs, Fixed APs, Cloud servers, Network Controllers, general communication network sources, as well as other sources of information that are considered trusted (e.g., vehicle sensors, off-vehicle sensors, cameras, traffic lights systems, emergency warning systems, road condition sensors, any or all of the sensors discussed herein, etc.).

In accordance with various aspects of this disclosure, the system, implemented in a vehicular environment, may provide higher priority on attending to (e.g., making, implementing, etc.) decisions to be implemented by vehicles moving at a relatively high speed, vehicles that are traveling on congested roads, emergency vehicles (e.g., ambulances, law enforcement vehicles, fire fighter vehicles, paramedics, rescue teams, etc.), vehicles that are close to other vehicles, etc. For example, in an example scenario in which a first vehicle is moving at twice the speed of a second vehicle, all other considerations equal, the first vehicle may be given priority over the second vehicle. Also for example, in an example scenario in which a first vehicle is on the open road and a second vehicle is in congested bumper-to-bumper traffic, all other considerations equal, the second vehicle may be given priority over the first vehicle. An emergency vehicle may, for example, be given priority over a personal vehicle. Additionally for example, in an example scenario in which a first vehicle is known to produce more pollution than a second vehicle (e.g., based on measurements, based on engine size, based on weight or load being hauled, based on engine type, etc.), the first vehicle may be given priority based on the theory that maintaining operation of the first vehicle at a constant speed if possible may ultimately reduce overall pollution. Conversely, in an example scenario, for example in which operation of environmentally responsible vehicles is being incentivized, electrical vehicles, fuel-cell vehicles, hybrid vehicles, small engine vehicles, etc., may be given priority over vehicle types that are know to be more damaging to the environment.

Example scenarios will now be presented to demonstrate various aspects of the present disclosure. It should be understood that such examples are provided herein merely for illustrative purposes and are not to be construed as limiting.

Figure 8:
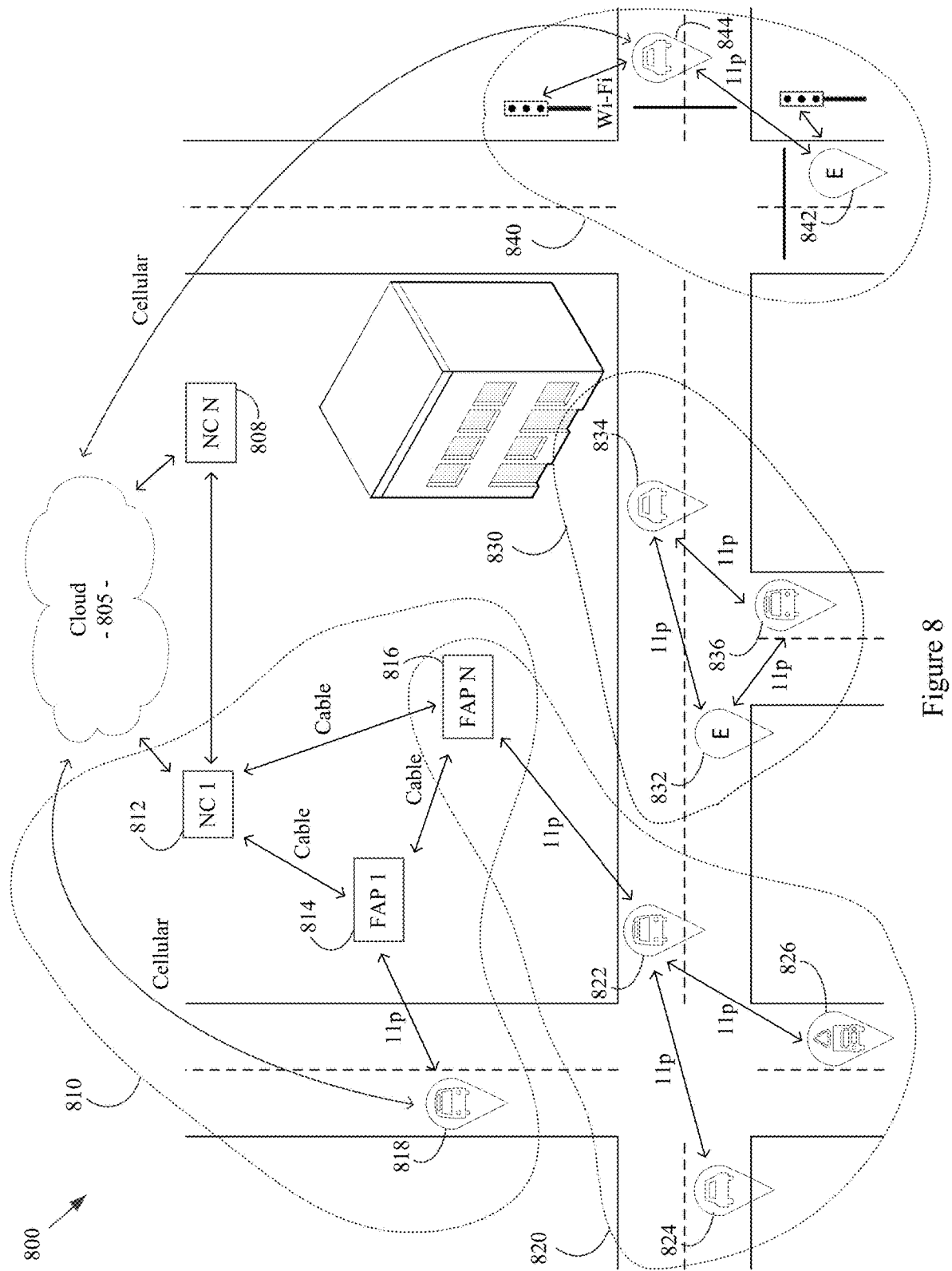
FIG. 8 shows a diagram of various example vehicle control scenarios, in accordance with various aspects of the present disclosure.

FIG. 8 shows a diagram of various example vehicle control scenarios, in accordance with various aspects of the present disclosure. The example scenarios 800 may, for example, share any or all characteristics with the other example methods, networks and/or network components 100, 200, 300, 400, 500-570, 600, 700, 900, 1000, 1100, 1200, 1300, and 1400, discussed herein.

In a first scenario 810, a Mobile AP is installed, for instance in an autonomous vehicle 818. In the example scenario 810, the vehicle 818 is moving at a very high speed, and is thus quickly approaching an intersection. In the example scenario 810, the system determines the best path (or trajectory) the vehicle should trust and implement at the intersection, as well as at the respective times associated with any significant trajectory alterations (e.g., time of turn, time of speed change, etc.). The system makes the trajectory decision for the intersection based, at least in part, on the context of the intersection being approached by the vehicle 818. Since, in the example scenario 810, there are no other vehicles nearby that came from the intersection, the Mobile AP of the vehicle 818 might not have current trusted intersection context information on which to determine a best decision that it should implement in that intersection. The Mobile AP may, however, contact the Fixed AP 814 nearby (e.g., having a coverage area that covers the intersection and/or an adjacent coverage area), which may provide the best (e.g., most recent, trusted, etc.) context information for the intersection. Note that the MAP may contact a plurality of Fixed APs that may have context information for the intersection (e.g., a second FAP that acts as a back-up for a first FAP, etc.). For example, the Fixed AP 814 may gather intersection context information from all vehicles leaving the intersection. The Fixed AP 814 may also, for example, contact other nearby Fixed APs (e.g., the Fixed AP 816) or other Mobile APs for context information about the intersection. Also for example, the Fixed AP 814 may contact Cloud sources 805 (e.g., databases, servers, central traffic or fleet controllers, etc.) to acquire context information about the intersection. The vehicle 818 (e.g., a Mobile AP or vehicle control circuitry thereof) may then process such information and/or interface to determine a best action to take and/or may interact with a server of the Cloud 805 to identify (e.g., agree upon, negotiate, etc.) a best action to take. Note that a Fixed AP may have responsibility for a plurality of intersections (or roads, on/off ramps, parking lots, etc.) or regions.

In a second example scenario 820, the vehicles 822, 824, and 826 are all approaching an intersection, and they should thus agree on the best path each one should take (e.g., resulting in a choreographed sequence of trajectory maneuvers that is both safe and efficient) through the intersection. Since there is a Fixed AP 816 nearby that can reliably communicate with all of the vehicles, the Fixed AP 816 may influence the routes followed by each of the vehicles 822, 824, and 826. In an example scenario, the vehicles 822, 824, and 826 may communicate with the Fixed AP 816 (e.g., directly or via multi-hop wireless communications, for example through a Mobile AP of the vehicle 822, etc.), and thus the Fixed AP 816 may have all of the context information required to determine and share the best actions to take in that intersection.

Note that the Fixed AP 816, when making these decisions, may consider trusted messages (e.g., advertisements, etc.) from one or more trusted sources of the Cloud 805, from other nearby trusted Fixed APs (e.g., Fixed AP 814, etc.), from a trusted Network Controller 812, from trusted Mobile APs, etc., about vehicles that are approaching the intersection at a high speed (e.g., refer to the first scenario 810 discussed herein). For example, when a vehicle is moving at a high speed, there may be less time (or more risk or more difficulty) associated with altering its planned trajectory once determined and agreed upon. In the second example scenario 820, the Fixed AP 816 may receive information from the Fixed AP 814 (or other node) regarding travel actions already established for the vehicle 818, and may thus consider the planned actions for the vehicle 818 when developing the best set of actions for the vehicles 822, 824, and 826 (e.g., even in a scenario in which the vehicles 822, 824, and 826 are not directly aware of the vehicle 818). For example, the Fixed AP 814 may consider actions of a vehicle that is relatively distant from an intersection when developing road action plans for other vehicles that are at (or relatively near) the intersection.

As discussed herein, a single FAP may have primary responsibility for a plurality of intersections or other traffic areas of interest. Another FP may have secondary responsibility for any of such intersections or other traffic areas of interest. A Mobile AP may contact any of such FAPs looking for context information from which to make road action decisions, road action instructions, etc.

In a third example scenario 830, there are presently no Fixed APs (or no trusted Fixed APs) available to assist the Mobile APs (or vehicle control systems associated therewith) to make the best overall decisions. In such case, and if each of vehicles 832, 834, and 836 will follow planned paths that will not limit the actions taken by the others (e.g., the vehicle 834 will proceed forward, while the other vehicles 832 and 836 will both turn right), the vehicles 832, 834, and 836 may share the respective actions they are planning to perform with the other vehicles, and the vehicles 832, 834, and 836 may locally agree on implementing those actions. In this example scenario 830, there may be no need to involve another entity (e.g., contacting a server or controller of the Cloud 805, contacting an AP, etc.).

In a fourth example scenario 840, the traffic light system is malfunctioning, and this information is broadcast through Wi-Fi transceivers coupled with the traffic lights. In the example scenario 840, the traffic light system is considered a trusted source by the system. The vehicles 842 and 844 may communicate with each other (e.g., utilizing Mobile AP links, etc.) and agree on the one that will proceed through the intersection first, since both vehicles want to move through the intersection and cross each other's path. In this example scenario 840, for example due to high buildings, only one vehicle 844 has a communication pathway (e.g., via a cellular link, etc.) with the Cloud 805, so such vehicle 844 may assume a leader role and contact the Cloud 805 to gather all the relevant context information that the vehicle 844 may then analyze to determine and share the actions that should be performed by both vehicles 842 and 844 in the intersection. Note that the traffic light system (or general traffic control system, for example, controlling speed, direction, lane selection, on/off ramp usage, etc.) may be determined to be malfunctioning in any of a variety of manners. For example, a traffic control system (or system monitoring the traffic control system operation) may transmit a message indicating whether the traffic control system is functioning properly. Also for example, failure to communicate with a traffic control system may be taken as a sign that the traffic control system is not functioning properly. Additionally for example, vehicles (or MAPs thereof) encountering anomalies while interacting with the traffic control system (e.g., having to take reactive evasive maneuvers, having to stop suddenly, etc.) may transmit messages to other vehicles (or MAPs thereof, or FAPs associated therewith, etc.) to indicate that the traffic control system may be malfunctioning.

In performing the vehicle action determination and/or implementation discussed herein, a system implemented in accordance with various aspects of this disclosure provides safety and security. Such safety and security may, for example, be provided utilizing secure methods, messaging and/or protocols. For example, methods may be implemented that ensure the decisions are made and shared among all of the relevant nodes available in the region in which the decisions are implemented (or enforced) in a trusted and secure fashion.

A consensus protocol may, for example, allow a set of nodes to eventually agree on a single value in a noisy network. Achieving a consensus in a vehicular network may, for example, comprise characteristics of a Byzantine Generals Problem. For example, messages may be lost, malicious nodes may attempt to tamper with a decision, a decision must be made in finite time (termination), etc. Also, when the environment changes in a significant manner, the nodes may run (or re-run) the consensus protocol to decide on the new actions (or values). The consensus may, for example, be decided by a commander/leader and/or interactively among the nodes. As discussed herein, several different approaches may be taken within the scope of this disclosure. Such approaches may be universal and/or may be selected based on particular operational context. Such approaches may, for example, comprise a centralized approach, a decentralized approach, a distributed approach, etc.

In an example centralized approach (or environment), the nodes may be coordinated by a single entity, the leader (e.g., a Cloud server, a Fixed AP near a traffic light, etc.). For example, all involved nodes may send their context (e.g., vehicle information, trajectory or route information, operational parameters about the vehicle, sensor information of sensors on-board or off-board the vehicle, etc.) to the leader.

Note that any or all of the context information may be provided a priori by the Cloud to the Fixed AP. The leader may then, for example, retrieve the information, make the decision and push the decision to every node. All nodes may then generally agree and implement the decision accordingly. If a node is unable (or unwilling) to implement the decision, the node may then contact the leader with an explanation, and the leader may modify the decision if necessary (e.g., time permitting, etc.). In an example implementation, a Fixed AP may maintain context information for all intersections or all traffic areas in its coverage area, may maintain vehicle context information for all vehicles having MAPs within its coverage area, etc.

Various example scenarios presented herein provided leaders such as Access Points, Fog-Computing nodes, and the Cloud (e.g., servers or controllers thereof). The selection of such leaders may, for example, be based on latency requirements. For example, selecting a local Fixed AP as a leader may be necessary when selecting a Cloud entity as the leader is associated with a predicted latency that is higher than acceptable. A vehicle may, for example, ask the leader for its action at the next road intersection, the Cloud can send the action, etc. Such communication may, for example, be synchronous (e.g., including a vehicle asking for an action in a pull system, etc.), asynchronous (e.g., a trusted leader sending action decisions to vehicles in a push system), or a combination thereof. Note that in a scenario in which a vehicle inquires about an action, such inquiry may trigger a consensus process involving any number of other nodes. Note that current or predicted latency and/or latency needs may vary in real-time. For example, latency needs (e.g., time constraints, etc.) may be tighter in congested and/or chaotic situations, time constraints may be looser on open roads, etc. Similarly, latency performance (e.g., how long it takes a node to make a road action decision, etc.) may be better during periods of low traffic (or low network utilization), etc. In an example scenario involving particular small latency requirements, the vehicle (or MAP thereof) may determine that there is no time to trigger a consensus process, and that the vehicle must act autonomously based on the context information already stored at the vehicle, detected by the vehicle sensors, etc.

In an example scenario, a vehicle may autonomously determine a road action while waiting for a vehicle-based (or MAP-based) consensus to completely, while waiting for road action instructions from a FAP, while waiting for road action instructions from a cloud-based central controller, etc. In such a scenario, if higher-level road action instructions are received (or received with at least a threshold amount of time before the road action need be implemented), the vehicle may implement road actions accordingly. For example, a road action determined by multi-vehicle consensus may be preferred to the autonomously determined road action, but only if such consensus is reached in time for each participating vehicle to prepare for and perform its respective road action. Similarly for example, a road action determined by a Fixed AP or cloud-based central controller may be preferred to the autonomously determined road action and/or a road action determined by MAP-based consensus, but only if such instructions are received in time for each participating vehicle to prepare for and perform its respective road action. Note that a universal acknowledgement may be required, or such a strategy could be run open loop.

In an example decentralized approach, the nodes (e.g., all nodes, all relevant nodes, etc.) may agree on a leader or a set of leaders to make the decision, for example assuming that the vehicles are strongly connected to each other, which is a typical scenario at a road intersection. For example, it may be assumed that all nodes are available and there are no failures).

The nodes may, for example run a leader election algorithm based, at least in part, on any of a variety of techniques, for example Raft, Paxos or mesh leader election algorithms. Many examples of such techniques may be utilized, various examples are provided by U.S. Provisional Patent Application Ser. No. 62/415,268, filed on Oct. 31, 2016, and titled "Systems and Methods for Tracking and Fault Detection, for Example Among Autonomous Vehicles, in a Network of Moving Things," which is hereby incorporated herein by reference in its entirety.

To perform such decisions, each node (e.g., vehicle, Mobile AP, etc.) involved in a consensus may periodically broadcast its context to its neighbors and/or the context can be sent to the nodes before the algorithm begins.

In an example scenario, when arriving at a specific road intersection, all nodes may determine whether they are able to see each other, so that the nodes may ensure that all of the nodes share the same context. Then, the nodes may converge on selecting the leader based on a deterministic value of the context such as the vehicle speed, proximity to the road intersection, level of trust, identity of the node, type of vehicle, vehicle traffic management capabilities, software version, number of passengers, fleet association, etc. For example, in an example scenario, municipal vehicles (e.g., buses, trains, street cars, maintenance vehicles, etc.) may have more capable (e.g., more expensive) systems and thus may generally be selected as leaders. Also for example, the respective system capabilities of each vehicle may be compared (e.g., system types, version numbers, release dates, etc.) so that the vehicle with the most capable system is selected to be the leader.

In an example distributed approach (e.g., fully distributed, etc.), for example like MANETs, the vehicles may coordinate with each other and make decisions without a leader and be able to tolerate and/or recover from failures, since the vehicles are not always able to see each other. These scenarios may, for example, occur when a node is unable to reach the Cloud, when there is not enough time for a Cloud-based (or FAP-based) solution, when a node is not able to see all nodes involved in an interaction, etc.

The scenario can be determined by each node, after inspecting the context shared by their neighbors, which may be able to see other nodes that the first is not able to see (e.g., a node can share its context, as well as the IDs and other information of the nodes they are able to see). When a node determines it may be unable to contact all the actors involved in a decision regarding an interaction, the node may make the most suitable decision, or leverage on the decision taken by other nodes nearby, or take the same action previously taken in the same scenario, which is probabilistic-driven.

In accordance with various aspects of the present disclosure, a system may improve its performance over time, resulting in improved decision-making. For example, after executing a plan, which comprises a trajectory to follow over a particular time, the actual trajectory may be compared with the planned one. For example, to minimize subsequent deviations from planned trajectories, information of the actual implementation, may inform future plans.

Such operation may have real-time immediate implications or long term implementations for the decision making. For example, when there is an unexpected event (e.g., a collision, a road obstruction, etc.) occurring, the vehicles quickly contact the Cloud to determine if any decisions should be reconsidered. The Cloud may also then consider such information when performing future decisions.

In accordance with various aspects of the present disclosure, the network of moving things may include any of a variety of types of vehicles (e.g., road vehicles, drones, planes, boats, etc.), which may negotiate with each other (and/or a central controller) and agree on trajectories they must each follow in order to avoid colliding, storing the agreement in a trusted manner. When there is a collision, a trusted element (e.g., node, module, database, etc.) storing the trajectories (or paths) of the vehicles may then be consulted to determine which moving thing was at fault (e.g., to determine which vehicle was in the wrong (or misunderstood) place at the wrong time, etc.). Such knowledge may, for example, lead to improvement of the overall traffic control system, may assist insurance companies in and/or public safety departments with identifying the cause (or fault) of an unfortunate event. Since such knowledge may originate from many more nodes than those directly involved in an incident, such knowledge may be more reliable overall for identifying an at-fault party.

Figure 9:
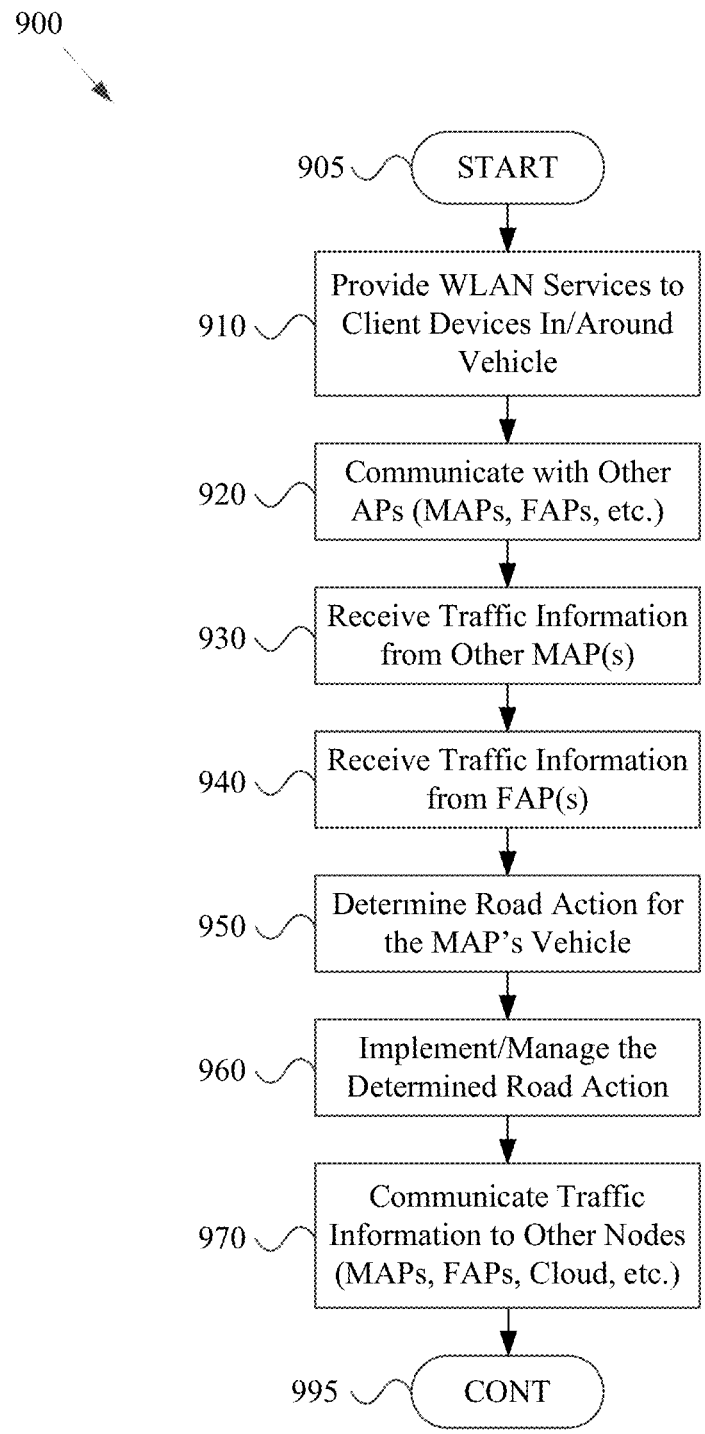
FIG. 9 shows a flow diagram of an example method for managing road actions, in accordance with various aspects of the present disclosure.

As an additional example of road action determination, FIG. 9 shows a flow diagram of an example method 900 for managing road actions, in accordance with various aspects of the present disclosure. The example method 900 may, for example, share any or all characteristics with the other example methods, networks and/or network components 100, 200, 300, 400, 500-570, 600, 700, 800, 1000, 1100, 1200, 1300, and 1400, discussed herein. For example, any or all aspects of the example method 900 of FIG. 9 may be implemented by a Mobile AP (or other network node, for example, a Fixed AP, a Network Controller, a cloud server, a central controller, etc.).

The example method 900 begins executing at block 905. The example method 900 may begin executing in response to any of a variety of causes or conditions, non-limiting examples of which are provided herein. For example, the example method 900 may begin executing upon power-up or reset of a system implementing the method 900. Also for example, the method 900 may begin executing in response to a received signal from another network node (e.g., a cloud server node, a Fixed AP, a Mobile AP, a Network Controller, an OBD system of a vehicle, etc.). Further for example, the method 900 may begin executing in response to a location-determining system determining that the node (e.g., a Mobile AP, etc.) implementing the method 900 is traveling toward a traffic intersection or other traffic control area. In general, the example method 900 may begin executing in response to any of a variety of causes or conditions. Accordingly, the scope of this disclosure should not be limited by characteristics of any particular cause or condition.

The example method 900 may, at block 910, comprise providing WLAN services to client devices in and/or around a vehicle (e.g., a vehicle in which a Mobile AP is installed, etc.). Block 910 may comprise providing the WLAN services in any of a variety of manners, non-limiting examples of which are provided herein. For example, the present disclosure provides numerous characteristics of a Mobile AP (or Fixed AP, etc.) that provides WLAN services (e.g., Wi-Fi-based WLAN services, etc.) to client devices that are within communication range of the Mobile AP.

The example method 900 may, at block 920, comprise communicating with other access points (e.g., MAPs, FAPs, etc.), base stations, etc. Block 920 may comprise communication with such other access points in any of a variety of manners, non-limiting examples of which are provided herein. For example, the present disclosure provides numerous characteristics of a Mobile AP (or Fixed AP, etc.) that communicates with other access points (e.g., MAPs, FAPs, etc.), base stations, etc. For example, such communication may be performed over DSRC links, cellular links, etc.

The example method 900 may, at block 930, comprise receiving traffic information from one or more other Mobile APs. Such traffic information may, for example, comprise vehicle context information, for example describing vehicle movement (e.g., velocity, speed, location, etc.) or planned movement (or route) characteristics, vehicle autonomous operation capability information, vehicle health information, OBD data, etc. Such traffic information may, for example, comprise traffic intersection context information (or context information for any traffic control area, for example, an on/off ramp, a parking area, a busy street, a toll plaza, a highway or roadway, etc.). Various examples of such traffic intersection (or other controlled area) context information are provided herein. Such traffic intersection context information may, for example, comprise information regarding traffic control system state (or operation), for example traffic light status or planned status. Also for example, such intersection context information may comprise information regarding the amount of congestion at an intersection, obstacles at an intersection, traffic flow rate through an intersection, duration of planned traffic control signals, etc.

Block 930 may comprise receiving the traffic information synchronously or asynchronously, for example by requesting such information from other MAPs, by receiving such information in an unsolicited manner, etc.

Note that block 930 may also comprise forwarding information received from other MAPs to the other MAPs, to one or more FAPs, to one or more central controllers, etc. For example, as discussed herein, in various implementations, such other nodes may be involved with road action decisions and/or may serve as repositories for traffic-related information (e.g., vehicle context information, intersection (or other controlled area) context information, etc.

The received traffic information may also, for example, comprise information indicating a road action that the MAP (or a vehicle carrying the MAP), and/or other MAPs, is to take. For example, as discussed herein, a leader MAP (or a distributed group of MAPs) may be selected to make road actions decisions for a particular choreographed set of maneuvers. In such a scenario, the traffic information may be received from the leader MAP and may direct the MAP (or vehicle thereof) to perform a particular one or more road actions.

In general, block 930 may comprise receiving traffic information from one or more other Mobile APs. Accordingly, the scope of this disclosure should not be limited by characteristics of any particular type of traffic information.

The example method 900 may, at block 940, comprise receiving traffic information from one or more FAPs. Such traffic information may, for example, comprise any or all of the intersection (or controlled region) and/or vehicle context information discussed herein. Such traffic information may, for example, comprise traffic intersection context information (or context information for any traffic control area, for example, an on/off ramp, a parking area, a busy street, a toll plaza, a highway or roadway, etc.). Various examples of such traffic intersection (or other controlled area) context information are provided herein. Such traffic intersection context information may, for example, comprise information regarding traffic control system state (or operation), for example traffic light status or planned status. Also for example, such intersection context information may comprise information regarding the amount of congestion at an intersection, obstacles at an intersection, traffic flow rate through an intersection, duration of planned traffic control signals, etc. As discussed herein, a FAP may be assigned to control (e.g., as a primary FAP controller, as a secondary FAP controller, etc.) one or more intersections within communication range of the FAP. In an example implementation, such a FAP may serve as the primary storage and source of information concerning such intersections. The FAP may then, for example, process such information (e.g., in combination with vehicle context information) to determine road actions and/or may provide such information to the MAPs so that the MAPs may utilize such information to make MAP-based road action decisions.

Such traffic information may, for example, comprise vehicle context information, for example describing vehicle movement (e.g., velocity, speed, location, etc.) or planned movement (or route) characteristics, vehicle autonomous operation capability information, vehicle health information, OBD data, etc. As discussed herein with regard to intersection information, the FAP (or another node coupled thereof) may serve as the primary storage and source of vehicle information. For example, in such an implementation, a MAP may receive vehicle information for vehicles associated with other MAPs from the FAP and/or directly from the MAPs. In a scenario in which information concerning another vehicle is received from the MAP of the vehicle and from a FAP, the receiving MAP may determine that the information received directly from the MAP is more accurate than the information received from the FAP (e.g., if such information from the different sources conflicts).

The received traffic information may also, for example, comprise information indicating a road action that the MAP (or a vehicle carrying the MAP) is to take. For example, as discussed herein, a leader MAP (or a distributed group of MAPs) may be selected to make road actions decisions for a particular choreographed set of maneuvers. In such a scenario, the traffic information may be received from the leader MAP and may direct the MAP (or vehicle thereof) to perform a particular one or more road actions.

Block 940 may comprise receiving the traffic information synchronously or asynchronously, for example by requesting such information from the FAP(s), by receiving such information in an unsolicited manner, etc. In an example scenario, if a MAP is approaching an intersection (or a series of intersections) and has not received up-to-date context information for the intersection and/or nearby vehicles, the MAP may request the information from the FAP (or other nodes).

In general, block 940 may comprise receiving traffic information from one or more Fixed APs. Accordingly, the scope of this disclosure should not be limited by characteristics of any particular type of traffic information.

The example method 900 may, at block 950, comprise determining a road action for the vehicle associated with the MAP (e.g., in which the MAP is installed, etc.). As discussed herein, such a determination may be performed autonomously by the MAP, for example based at least in part on the information received at blocks 930 and/or 940. Also as discussed herein, such a determination may be made in concert with other MAPs at or near the intersection (e.g., through negotiations, by selecting a leader MAP for making the determination, etc.). Many examples of selecting a leader for a determination are provided herein, for example in the discussion of FIG. 8, etc. Additionally, as discussed herein, such a determination may be originated at a FAP, NC, cloud server, central controller, etc. Thus, depending on the particular scenario, the MAP may make its own determination and/or may receive the determination from another node. In a manner similar to selecting a leader, the algorithm utilized for determining road actions may be selected, depending on real-time circumstances (e.g., latency needs, emergency status, the presence of unanticipated vehicles or other obstacles, etc.).

Block 950 may comprise the MAP system selecting between an autonomously-determined action and an action received from another node. For example, such selection may be priority-based. In an example scenario, the MAP may choose to follow instructions received from a central controller, over those received from a FAP, over those received from another MAP, over those autonomously determined. Note that in an emergency scenario, for example in which a dangerous or unexpected situation is sensed (e.g., an obstacle is detected at an unexpected location), the MAP may revert to utilizing its autonomously-determined road action, at least until the dangerous or unexpected situation has passed. For example, when no higher-priority road action information is received (e.g., from a FAP, from an NC, from a cloud server, etc.), the MAP may attempt to reach a local road action consensus with other MAPs at or near an intersection. If such attempt fails, the MAP may then autonomously determine the road actions for its vehicle.

Block 950 may, for example, comprise the MAP system determining road actions based on a universally-downloaded algorithm (or road action optimization instructions). As discussed herein, a central controller or other node may provide an algorithm designed to optimize particular traffic-related parameters, weighted to favor movement of prioritized vehicles through an intersection over disfavored vehicles, emphasizing the reduction of pollutants associated with starting/stopping freight vehicles, etc. The MAP may then execute the algorithm utilizing the traffic information received at blocks 930 and/or 940. In an example scenario, a selected leader MAP for a choreographed set of maneuvers may execute the algorithm and inform the other MAPs of the result. In another example scenario, each MAP may independently execute the algorithm, which should yield the same resulting road action plan if each MAP has the same algorithm and the same input information. Note that, as discussed herein, the MAP may have back-up emergency control to respond to unforeseen events, which may include another MAP (or vehicle thereof) not traveling as expected.

In general, block 950 may comprise determining a road action for the vehicle associated with the MAP. Accordingly, the scope of this disclosure should not be limited by characteristics of any particular manner of performing such determining.

The example method 900 may, at block 960, comprise implementing (or managing) the determined road action. Block 960 may comprise performing such implementing in any of a variety of manners, non-limiting examples of which are provided herein.

Block 960 may, for example, comprise the MAP interacting with a dedicated vehicle control system of a vehicle, for example, providing road action movements, times, conditions, etc., which when executed will result in the vehicle making the desired movement. Block 960 may, for example, comprise monitoring the movement of the vehicle of the MAP, monitoring the movements of other vehicles, monitoring intersection and vehicle context, etc., for example to sure that the movement choreography is playing out as expected. Additionally, as will be discussed next, the MAP may report information regarding the monitoring. For example, the MAP may maintain a record of actual vehicle movement, intersection conditions, behavior of traffic control systems local to the intersection, unexpected deviations from a movement plan (on the part of the MAP's vehicle or any vehicle or object), etc.

In general, block 960 may comprise implementing (or managing) the determined road action. Accordingly, the scope of this disclosure should not be limited by characteristics of any particular manner of implementing or managing.

The example method 900 may, at block 970, comprise communicating traffic information to other nodes (e.g., other MAPs, FAPs, Network Controllers, cloud servers, central traffic controllers, etc.). Block 970 may comprise performing such communicating in any of a variety of manners, non-limiting examples of which are provided herein.

For example, as mentioned herein, during a vehicle's travel to, through, and from a traffic intersection (or other controlled area), the MAP may monitor vehicle and traffic intersection context. As the MAP is near the traffic intersection (e.g., moving toward the intersection, moving through the intersection, moving from the intersection, sitting stationary, etc.), the MAP may communicate information indicative of such monitoring to other nodes. For example, the MAP may communicate such information to other MAPs (e.g., of vehicles traveling toward the intersection, other vehicles with which the MAP was coordinating movements with, other MAPs as a multi-hop communication upstream to infrastructure nodes, etc.).

Also for example, the MAP may communicate such information to one or more FAPs. As mentioned herein, one or more FAPs may be responsible for coordinating movement of vehicles through one or more respective intersections (or other controlled areas). In such an implementation, block 970 may comprise the MAP communicating current information (e.g., vehicle context information, intersection context information, information regarding whether a recommended road action (or set thereof) was implemented and how well it worked, etc.). Block 970 may, for example, comprise performing such communicating utilizing any one or more of the types of communication links discussed herein.

Block 960 may, for example, comprise communicating the traffic information synchronously (e.g., in response to an inquiry or poll from the destination node, etc.) or asynchronously (e.g., when the MAP has the necessary processing cycles and/or communication bandwidth to safely perform such communicating).

In general, block 970 comprises communicating traffic information to other nodes. Accordingly, the scope of this disclosure should not be limited by characteristics of any particular type of communicating, or by characteristics of any particular information communicated.

The example method 900 may, at block 995, comprise performing continued processing. Block 995 may comprise performing any of a variety of types of continued activity, non-limiting examples of which are provided herein.

For example, block 995 may comprise directing execution flow of the example method 900 to any of the other blocks of the example method 900, or any portion of such blocks. Also for example, block 995 may comprise directing execution flow of the example method 900 to any other method block or step or function discussed herein.

Figure 10:
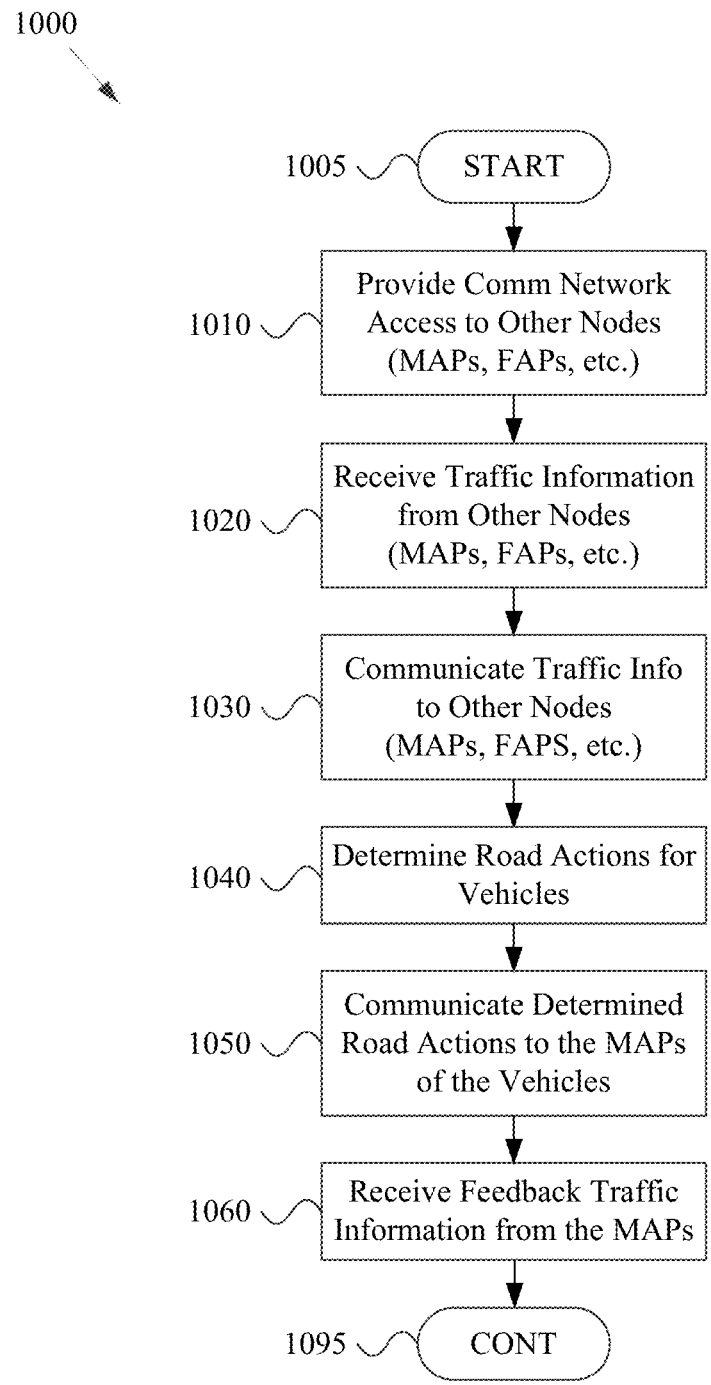
FIG. 10 shows a flow diagram of an example method for managing road actions, in accordance with various aspects of the present disclosure.

As a further example of road action determination, FIG. 10 shows a flow diagram of an example method 1000 for managing road actions, in accordance with various aspects of the present disclosure. The example method 1000 may, for example, share any or all characteristics with the other example methods, networks and/or network components 100, 200, 300, 400, 500-570, 600, 700, 800, 900, 1100, 1200, 1300, and 1400, discussed herein. For example, any or all aspects of the example method 1000 of FIG. 10 may be implemented by a Fixed AP (or other network node, for example, a Mobile AP, a Network Controller, a cloud server, a central controller, etc.). In an example scenario, one or more Mobile APs may be operating in accordance with the example method 900 of FIG. 9, and one or more Fixed APs may be operating in accordance with the example method 1000 of FIG. 10.

The example method 1000 begins executing at block 1005. The example method 1000 may begin executing in response to any of a variety of causes or conditions, non-limiting examples of which are provided herein. For example, the example method 1000 may begin executing upon power-up or reset of a system implementing the method 1000. Also for example, the method 1000 may begin executing in response to a received signal from another network node (e.g., a cloud server node, a Fixed AP, a Mobile AP, a Network Controller, an OBD system of a vehicle, etc.). In general, the example method 1-000 may begin executing in response to any of a variety of causes or conditions. Accordingly, the scope of this disclosure should not be limited by characteristics of any particular cause or condition.

The example method 1000 may, at block 1010, comprise providing communication network access to other nodes. Block 910 may comprise providing the communication network access in any of a variety of manners, non-limiting examples of which are provided herein. For example, the present disclosure provides numerous characteristics of a Fixed AP (or Mobile AP, etc.) that provides communication network access services (e.g., DSRC-based access, cellular-based access, etc.) to other devices that are within communication range of the Fixed AP. The communication network may, for example, comprise a communication network, many example characteristics of which are provided herein. For example, block 910 may comprise a Fixed AP providing Internet or cloud access to Mobile APs (or clients thereof), to other Fixed APs, etc.

The example method 1000 may, at block 1020, comprise receiving traffic information from other nodes. Such traffic information may comprise characteristics of any or all of the types of traffic information discussed herein (e.g., traffic intersection context information, vehicle context information, road action information, etc.). Block 1020 may, for example, comprise a node (e.g., a FAP, etc.) receiving such information from Mobile APs that are traveling (or have traveled) through an intersection (or other controlled area). Also for example, block 1020 may comprise the node (e.g., a FAP, etc.) receiving such information from a FAP (e.g., a redundant FAP, a FAP with primary or secondary responsibilities for an intersection, etc.). Additionally for example, block 1020 may comprise the node (e.g., a FAP, etc.) receiving such information from a cloud server or central controller, from a network controller, etc.).

Block 1020 may, for example, comprise receiving the information in a solicited or unsolicited manner. For example, the node (e.g., a FAP, etc.) implementing the method 1000 may comprise sending inquiry (or poll) messages to traffic control systems or traffic monitoring systems at intersections for which the node is responsible, and receiving the information in response to such messages. Also for example, block 1020 may comprise receiving such information in an unsolicited manner, for example periodically, upon state change of the traffic control system, etc.

In another example scenario, block 1020 may comprise sending inquiry (or poll) messages to MAPs of vehicles that are traveling through (or have traveled through, or are traveling toward) an intersection, and receiving the information from the MAPs in response to such messages. Also for example, block 1020 may comprise receiving such information from the MAPs in an unsolicited manner, for example periodically, when a MAP is passing through an intersection, when a MAP has successfully passed through the intersection, as a MAP is traveling toward an intersection, etc.

In yet another example scenario, block 1020 may comprise sending inquiry (or poll) messages to other FAPs that are associated with particular vehicles or intersections (or other controlled areas). For example, block 1020 may comprise a secondary FAP for an intersection sending inquiry messages to a primary FAP for the intersection, for example to ensure that each FAP has the same information.

In still another example scenario, a central controller (e.g., a cloud server) that oversees operation of the FAPs (e.g., for traffic-related functionality) may update traffic and/or vehicle information of the FAPs by propagating current intersection (or other controlled area) and/or vehicle information to the FAPs.

Block 1020 may comprise receiving the traffic information from the other nodes through any of the types of communication links discussed herein. For example, block 1020 may comprise receiving the information through wired (or tethered optical) communication infrastructure, block 1020 may comprise receiving the traffic information from other FAPs or from MAPs over DSRC links, etc.

In general, block 1020 may comprise receiving traffic information from other nodes. Accordingly, the scope of this disclosure should not be limited by characteristics of any particular manner of receiving such information or by characteristics of any particular type of traffic information.

The example method 1000 may, at block 1030, comprise communicating traffic information to other nodes. Block 1030 may comprise performing such communicating in any of a variety of manners, non-limiting examples of which are provided herein.

For example, block 1030 may comprise communicating any or all of the information received at block 1020 to any of the other nodes discussed herein. For example, block 1030 may comprise communicating information regarding traffic intersections (or other controlled areas) and information regarding vehicles to MAPs of vehicles within communication range of the node (e.g., a FAP, etc.). For example, as discussed herein, a FAP may have traffic control responsibilities for one or more traffic intersections (or other controlled areas) within communication range of the FAP. The FAP may, for example at block 1030, communicate traffic information regarding such intersections and/or associated vehicles to the vehicles in the FAPs coverage area, to the respective vehicles near a respective intersection (or controlled area), etc.

As discussed herein, the FAP may pass intersection and/or vehicle context information on to the Mobile APs for the MAPs to utilize in making their own road action decisions and/or the FAP may make the road action decisions and communication such decisions to the MAPs.

Block 1030 may, for example, comprise a FAP communicating the traffic information to a peer FAP. For example, a FAP having primary responsibilities for a particular traffic intersection may communicate the traffic information to a FAP having secondary responsibilities for the traffic intersection (or vice versa). Block 1030 may also, for example, comprise a FAP communicating the traffic information to an upstream node (e.g., to a network controller, to a cloud server or central controller, etc.).

The node (e.g., a FAP) may communicate the information in any of a variety of manners. For example, a FAP may unicast the information to each MAP, a FAP may multi-case the information for an intersection to a multicast group of MAPs at or near the intersection, a FAP may broadcast the information to all MAPs within the FAP's coverage area, etc.

Block 1030 may comprise communicating the information in a synchronous and/or asynchronous manner. For example as discussed herein, Mobile APs may solicit intersection and/or road action information from a FAP. Also, cloud servers or central controllers may solicit intersection and/or vehicle information from a FAP. Block 1030 may, for example, comprise communicating the traffic information periodically, as soon as new information is received, etc.

In an example scenario, block 1030 may comprise determining respective locations and/or routes of MAPs in its coverage area, identifying a respective group of MAPs for each intersection based on MAP locations and intersection locations, and communicating information for each intersection to the respective group of MAPs for each intersection.

In general, block 1030 may comprise communicating traffic information to other nodes. Accordingly, the scope of this disclosure should not be limited by characteristics of any particular type of traffic information or of any particular manner of communicating such traffic information.

The example method 1000 may, at block 1040, comprise determining road actions. Block 1040 may comprise a node (e.g., a FAP, NC, cloud server, central controller, etc.) determining road actions for vehicles in any of a variety of manners, non-limiting examples of which are provided herein. For example and without limitation, the discussions of FIGS. 8 and 9 include many examples of road action determination.

For example, as discussed herein a FAP may make road action decisions, or such decisions may be made at other nodes (e.g., other FAPs, Network Controllers, cloud servers, central controllers, etc.). Thus, the FAP may originate some or all of the road action decisions and/or may pass through decisions made by other nodes.

In an example scenario in which a FAP has responsibility for controlling traffic through an intersection in its coverage area, the FAP may maintain enough context information regarding the interaction and the vehicles in its coverage area to have an accurate picture of not only the immediate context of the intersection, but also of the future context of the intersection. For example, the FAP has knowledge of the traffic that is traveling toward the intersection, where a local traffic controller or Mobile AP at the intersection might not have such knowledge. The FAP may thus be uniquely suited to make road action decisions for the vehicles. In addition, with regard to latency, the FAP may be close enough to the intersections, and have a small enough area of responsibility, to provide low latency for road action determinations. For example, a central controller for an entire metropolitan area might not have the necessary processing power and access to the necessary communication link bandwidth to effectively control the movements of all vehicles in a timely manner.

Block 1040 may comprise performing such road action determining by executing an optimization algorithm designed to achieve one or more emphasized goals. For example, as discussed herein, block 1040 may offer movement priority through an intersection for environmentally responsible vehicles, for ride share or multi-occupancy vehicles, etc. Block 1040 may also offer movement priority through an intersection for mass transit vehicles, for scheduled vehicles of a fleet that are behind schedule, for emergency vehicles during the course of an emergency, etc. In another example scenario, the optimization algorithm may be designed to achieve maximum overall vehicle throughput through the intersection, for example in the absence of special circumstances.

In general, block 1040 may comprise determining road actions for vehicles. Accordingly, the scope of the present disclosure should not be limited by characteristics of any particular manner of performing such determining.

The example method 1000 may, at block 1050, comprise communicating the determined road actions to the MAPs of the vehicles. Block 1050 may comprise performing such communicating in any of a variety of manners, non-limiting examples of which are provided herein. Note that, as discussed herein, the communicated information may also (or alternatively) include intersection and/or vehicle context information from which MAPs can make their own road action decisions (e.g., as a group, autonomously, etc.).

Block 1050 may, for example, comprise communicating such information utilizing any or all of the types of communication links discussed herein. For example, in an example scenario, a FAP may communicate the road action information (or context information) to a MAP over a DSRC link, through a multi-hop DSRC link through one or more FAPs and/or MAPs, etc.

Block 1050 may, for example, comprise performing such communicating in a synchronous or asynchronous manner. The example, block 1050 may comprise communicating such information to a MAP upon request (e.g., requested by a MAP that is approaching a vehicle, etc.). Also for example, block 1050 may comprise asynchronously pushing such information to a MAP (e.g., when a FAP (or other node) determines that the MAP is approaching an intersection or other controlled traffic area). Additionally, for example, block 1050 may comprise continually communicating updated road action information to all MAPs operating within the coverage area of the FAP (or other node).

In general, block 1050 may comprise communicating the determined road actions to the MAPs of the vehicles. Accordingly, the scope of this disclosure should not be limited by characteristics of any particular manner of performing such communicating.

The example method 1000 may, at block 1060, comprise receiving feedback traffic information from the MAPs. Block 1060 may comprise performing such receiving in any of a variety of manners, non-limiting examples of which are provided herein.

For example, as discussed herein with regard to block 970 of the example method 900 of FIG. 9, MAPs may communicate context information for traffic intersections (or other controlled areas) or vehicles. Block 1060 may, for example, comprise receiving such information from the MAPs.

The received information may, for example, comprise updated vehicle and/or intersection context information. Also for example, the received information may comprise information indicating a level of success for the performed road actions. For example, such information may comprise information indicating deviations from a planned road action, unexpected circumstances that may have caused deviation from the planned road action. Also for example, such information may comprise information indicating traffic intersection and/or vehicle context information that was determined by the MAP to be incorrect. Additionally, for example, such information may comprise information indicating temporary and/or permanent intersection conditions that were not previously identified.

Block 1060 may comprise receiving information from the MAPs in a synchronous (e.g., solicited) and/or asynchronous (e.g., unsolicited) manner. For example, in an example scenario, a MAP may communicate the information whenever the MAP has information prepared to communicate. Also for example, block 1060 may comprise the node (e.g., FAP, etc.) communicating a message to a MAP (e.g., a MAP that has just passed through an intersection) requesting the information from the MAP.

In general, block 1060 may comprise receiving feedback traffic information from the MAPs. Accordingly, the scope of the present disclosure should not be limited by characteristics of any particular traffic information or by characteristics of any particular manner of receiving such information.

In accordance with various aspect of this disclosure, systems and methods are provided to ensure that information regarding vehicle action decisions made and/or implemented cannot be rolled back (e.g., are secure and/or extremely difficult if not impossible to modify, hack, or fake once the actions are implemented). Additionally, the efficient communication of vehicle action information may provide for other nearby vehicles to immediately know that the vehicle is deviating from the agreed-upon plan so that the other nearby vehicles may react in time to avoid a collision and/or to determine whether the deviation is relevant or irrelevant.

The decisions and actions (e.g., whether in conformance with the decisions or not) may thus be recorded in a safe and secure manner that is not reversible, such that the recorded history may not be altered. Various aspects of the present disclosure provide for multiple mechanisms or techniques by which this may be accomplished. For example, a centralized and/or distributed strategy may be implemented.

In an example centralized strategy, each node may be trusted by a single entity, for example using a centralized authority (PKI), a reputation mechanism such as PGP, etc. Each node (or an AP) may send an agreed (or signed) contract to the Cloud (e.g., a server thereof, etc.) or AP. The data may be signed by the node and sent to the central entity, which then verifies the node identify and securely stores the data. In general, all nodes will trust this central entity.

In an example distributed strategy, each node involved in an event (e.g., an intersection maneuver or sequence thereof, etc.) may keep a log of the messages/actions between all involved nodes. When a node sends a new message, the message may comprise: a Hash {log+message}, a Hash signature, and a Message. When a node retrieves a message, the node may hash its log as well and verify the hash match and signature. Depending on the action consensus decision, the node may add the action to its log and perform the agreed-upon action. The nodes may thus keep an agreed distributed log. Note that any or all of this information may also be propagated to other nodes (e.g., other vehicle nodes or Mobile APs thereof, Fixed APs, Network Controllers, Cloud servers, central controllers, fleet controllers, etc.).

While various algorithms, such as blockchain, may require proof-of-work (e.g., to present Sybil attacks or "forged identity" attacks), the nodes may develop trust between each other utilizing keys, for example using PKI, PGP, or other distributed trust algorithms. The trust may, for example, be absolute (e.g., utilizing a centralized trust unit, or decentralized architecture). In an example reputation-based trust mechanism, a node A trust in node B may be viewed (or defined) as a sum of the trust of other nodes in node B and the current trust of node A in node B. The trust may, for example, result from previous experiences in which the other node behaved as expected (or not), resulting in an overall (e.g., distributed, etc.) determination of whether or not another node (or vehicle) may be trusted based on previous experiences involving the other node, based on context, etc.

In accordance with various aspects of the present disclosure, a system may improve its performance over time, resulting in improved decision-making. For example, after executing a plan, which comprises a trajectory to follow over a particular time, the actual trajectory may be compared with the planned one. For example, to minimize subsequent deviations from planned trajectories, information of the actual implementation, may inform future plans.

Such operation may have real-time immediate implications or long term implementations for the decision making. For example, when there is an unexpected event (e.g., a collision, a road obstruction, etc.) occurring, the vehicles quickly contact the Cloud to determine if any decisions should be reconsidered. The Cloud may also then consider such information when performing future decisions.

In accordance with various aspects of the present disclosure, the network of moving things may include any of a variety of types of vehicles (e.g., road vehicles, drones, planes, boats, etc.), which may negotiate with each other (and/or a central controller) and agree on trajectories they must each follow in order to avoid colliding, storing the agreement in a trusted manner. When there is a collision, a trusted element (e.g., node, module, database, etc.) storing the trajectories (or paths) of the vehicles may then be consulted to determine which moving thing was at fault (e.g., to determine which vehicle was in the wrong (or misunderstood) place at the wrong time, etc.). Such knowledge may, for example, lead to improvement of the overall traffic control system, may assist insurance companies in and/or public safety departments with identifying the cause (or fault) of an unfortunate event. Since such knowledge may originate from many more nodes than those directly involved in an incident, such knowledge may be more reliable overall for identifying an at-fault party.

Figure 11:
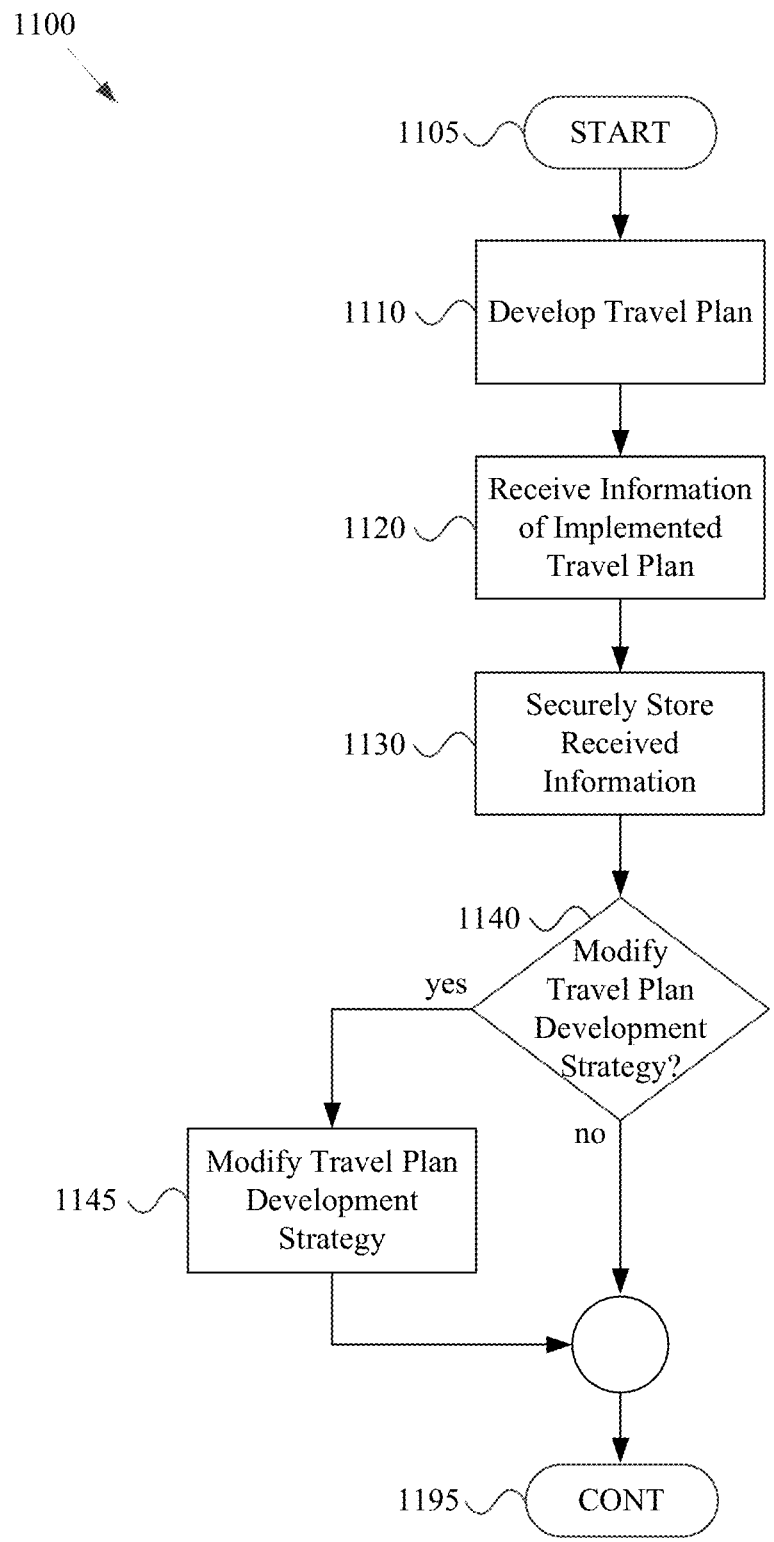
FIG. 11 shows a flow diagram of an example method for controlling vehicle travel, in accordance with various aspects of the present disclosure.

FIG. 11 shows a flow diagram of an example method for controlling vehicle travel, in accordance with various aspects of the present disclosure. The example method 1100 may, for example, share any or all characteristics with the other example methods, networks and/or network components 100, 200, 300, 400, 500-570, 600, 700, 800, 900, 1000, 1200, 1300, and 1400, discussed herein.

The example method 1100 begins executing at block 1105. The example method 1100 may begin executing in response to any of a variety of causes or conditions. For example, the example method 1100 may begin executing in response to a power-up or reset condition of a node implementing the method 1100 or any portion thereof. Also for example, the method 1100 may begin executing in response to a signal indicating that one or more vehicles are at or approaching a location (e.g., at an intersection, on/off ramp, vehicle merge location, parking lot exit, bus stop, railroad crossing, shopping mall parking lot, etc.) at which vehicle travel guidance is generally provided. Additionally for example, the method 1100 may begin executing in response to a request received from a vehicle (e.g., a vehicle control system, Mobile AP, etc., thereof) for travel guidance. Further for example, the method 1100 may begin executing in response to a signal indicative of an emergency condition, a traffic jam, a time of day, etc. Also for example, the method 1100 may continually (or periodically) execute. The scope of the present disclosure should not be limited by characteristics of any particular initiating cause or condition.

The example method 1100 may, at block 1110, comprise developing a travel plan. Block 1110 may comprise developing the travel plan in any of a variety of manners, non-limiting examples of which are provided herein. For example, many examples are provided herein with regard to FIG. 8, and elsewhere herein. Many examples of travel plan development for one or more vehicles are provided herein. For example, block 1110 may comprise developing a travel plan at an intersection (e.g., at a traffic light, at a merge location, at an on/off ramp, at a parking lot, at a loading/unloading zone, etc.) for one or more vehicles based on established rights-of-way, based on vehicle priority, based on vehicle speed, based on intersection control signals, based on vehicle schedule, etc.

The example method 1100 may, at block 1120, comprise receiving information of an implemented travel plan. Block 1120 may comprise receiving such information in any of a variety of manners, non-limiting examples of which are provided herein.

For example, block 1120 may comprise receiving information identifying vehicle travel movement of one or more or all of the vehicles involved in a vehicle travel plan. As discussed herein, such information may comprise vehicle ID information, location information, speed or velocity information, trajectory information, time information, sensor information, etc. Also for example, such information may comprise information regarding whether the vehicle did follow or intended to follow a vehicle travel (or movement) plan. In an example scenario in which the vehicle did not follow a vehicle travel plan (e.g., a previously agreed-upon travel plan, etc.), for example intentionally or unintentionally, the information may comprise information that caused the vehicle to deviate from the vehicle travel plan (e.g., information explaining why the vehicle deviated from the vehicle travel plan, sensor readings, communications from other vehicles, etc.). Also for example, the received information may comprise information.

Block 1120 may comprise receiving the information via any of a variety of media and/or communication pathways. For example, block 1120 may comprise receiving the information via a vehicle communication network, via a cellular network, etc. Block 1120 may, for example, comprise communicating (e.g., receiving, transmitting, etc.) the information in a delay-tolerant manner, in a real-time manner, etc.

The example method 1100 may, at block 1130, comprise securely storing the information received at block 1120. Block 1130 may comprise securely storing (or handling) the information in any of a variety of manners, non-limiting examples of which are provided herein.

For example, block 1130 may comprise validating the received information (e.g., via hash processing, decrypting, authenticating, etc.). Block 1130 may, for example, comprise encrypting such information, storing redundant copies of such information (e.g., at geographically distinct sites with different respective security protocols, etc.). Block 1130 may comprise storing such information in a database, where such information is linked (e.g., by event, by a vehicle travel plan, by time, by geographical location, etc.) in a manner in which the information is readily retrievable (e.g., for event recreation, etc.).

The example method 1100 may, at block 1140, comprise determining whether the strategy utilized to develop the travel plan at block 1110 should be modified, and controlling the flow of the example method 1100 based on such determination.

Block 1140 may comprise making such a determination in any of a variety of manners, non-limiting examples of which are provided herein. For example, block 1140 may comprise determining whether the travel plan was implemented by the relevant vehicles without the occurrence of any significant events (e.g., collisions, near collisions, significant traffic flow disruptions, etc.), which may for example be indicative of the system operating well. Also for example, block 1140 may comprise determining that the travel plan was successfully implemented by the relevant vehicles, but that a collision nearly occurred (e.g., a vehicle passed too close to another vehicle, person, object, etc.), which may for example be indicative of the system needing to adjust the travel plan development strategy to provide a larger space buffer (e.g., time and/or distance between vehicles, etc.), account for various unpredictable events, etc. Additionally for example, block 1140 may comprise determining that a collision occurred, which will generally be indicative of a need to modify the travel plan development strategy, for example to account for the cause of the collision (e.g., unknown road conditions, an undetected object or vehicle, a vehicle unable to implement a travel plan correctly, operator interference, unanticipated traffic control system behavior, etc.).

Further for example, block 1140 may comprise determining to modify the strategy based on received information indicating that a vehicle deviated from a vehicle travel plan and/or based on received information indicating why a vehicle deviated from the vehicle travel plan. For example, a deviation due to a road condition (or other unexpected condition), a permanent or recurring obstacle, an object or obstacle, etc., may result in modifying the strategy, while a relatively rare event (e.g., like a ball or dog suddenly entering an intersection) might not result in modifying the strategy. Additionally for example, a deviation due to respective capability of a particular vehicle may result in modification of the strategy for developing travel plans for that particular vehicle, but not for others. For example, some vehicles may be known to have relatively poor traction relative to other vehicles, relatively better braking and/or acceleration capability than other vehicles, etc. Also for example, some vehicles may be known to have better (or more advanced) sensing capabilities, faster response times, more agility, etc.

If it is determined to modify the travel plan development strategy, then block 1140 directs execution flow of the example method 1100 to block 1145. If it is determined that no modification to the travel plan development strategy is warranted, then block 1140 directs execution flow of the example method 1100 to block 1195 for continued operation.

The example method 1100 may, at block 1145, comprise modifying the travel plan development strategy utilized at block 1110. Block 1145 may comprise modifying the travel plan development strategy in any of a variety of manners, non-limiting examples of which are provided herein. For example, block 1145 may comprise modifying a weight assigned to a cost function parameter (e.g., a weight associated with any of the cost function parameters discussed herein, etc.), adding or removing a factor from consideration, modifying a model vehicle velocity profile, adjusting a vehicle prioritization scheme, modifying a time window for vehicle movement, modifying a target distance buffer (or target separation) between vehicles and/or other objects, etc.

Block 1145 may also, for example, comprise modifying a map on which the travel plan is based to include an object that was not previously known or considered, a traffic control system behavior that was not previously known or considered, a road condition, etc.).

The example method 1100 may, at block 1195, comprise continuing operation. For example, block 1195 may direct execution flow to any block, or portion thereof, of the example method 1100. Also for example, block 1195 may direct execution flow to any block, or portion thereof, of any example method discussed herein.

The example method 1100, or any portion thereof, may be implemented by any or all of the communication system nodes discussed herein. For example, the example method 1100 may be implemented by a Cloud server, a central traffic controller, a fleet traffic controller, a Network Controller, a Fixed AP, a Mobile AP, an autonomous vehicle control system, etc.

Figure 12:
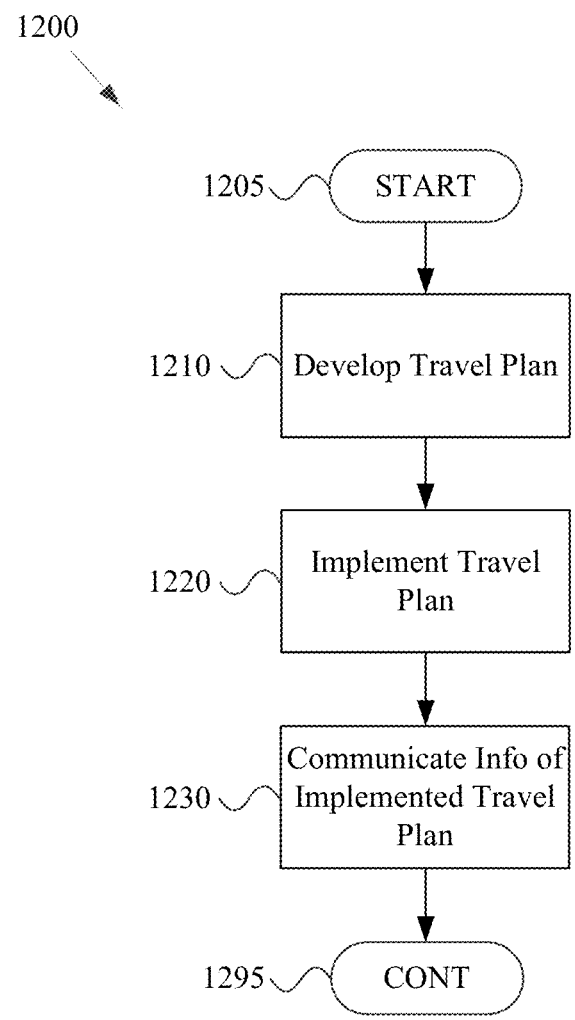
FIG. 12 shows a flow diagram of an example method for controlling vehicle travel, in accordance with various aspects of the present disclosure.

FIG. 12 shows a flow diagram of an example method for controlling vehicle travel, in accordance with various aspects of the present disclosure. The example method 1200 may, for example, share any or all characteristics with the other example methods, networks and/or network components 100, 200, 300, 400, 500-570, 600, 700, 800, 900, 1000, 1100, 1300, and 1400, discussed herein.

The example method 1200 begins executing at block 1205. The example method 1200 may begin executing in response to any of a variety of causes or conditions. For example, the example method 1200 may begin executing in response to a power-up or reset condition of a node implementing the method 1200 or any portion thereof. Also for example, the method 1200 may begin executing in response to a signal indicating that a vehicle (or one or more vehicles) implementing the method 1200 is at or approaching a location (e.g., at an intersection, on/off ramp, vehicle merge location, parking lot exit, bus stop, railroad crossing, shopping center parking lot, event parking lot, etc.) at which vehicle travel guidance is generally provided. Additionally for example, the method 1200 may begin executing in response to a request received from a vehicle (e.g., a vehicle control system, Mobile AP, etc., thereof) for travel guidance. Also for example, the method 1200 may begin executing in response to a signal received from another node of the network (e.g., from a Cloud server, from a node implementing the example method 1100 of FIG. 11, from a vehicle near a node implementing the example method 1200, etc.). Further for example, the method 1200 may begin executing in response to a signal indicative of an emergency condition, a collision, a near collision, a traffic jam, a time of day, etc. Also for example, the method 1200 may continually (or periodically) execute. The scope of the present disclosure should not be limited by characteristics of any particular initiating cause or condition.

The example method 1200 may, at block 1210, comprise developing a travel plan. Block 1210 may comprise developing the travel plan in any of a variety of manners, non-limiting examples of which are provided herein. Block 1210 may, for example, share any or all characteristics with block 1110 of the example method 1100 of FIG. 11.

Block 1210 may, for example, comprise receiving the travel plan from a central controller (e.g., a Cloud server, etc.). Also for example, block 1210 may comprise receiving the travel plan from another vehicle. Additionally for example, block 1210 may comprise receiving the travel plan from Fixed AP, Network Controller, or other node of a vehicle communication network. Also for example, block 1210 may comprise negotiating with the source of a received travel plan and/or with other relevant vehicles to reach consensus on an overall travel plan, which may involve coordinates movements of a plurality of vehicles. Block 1210 may additionally, for example, comprise developing the travel plan within a vehicle implementing the example method 1200 or any portion thereof.

Block 1210 may comprise detecting an unexpected condition (e.g., a road condition, an obstacle, a person, another vehicle, an emergency condition, etc.) and deviating from a received travel plan to accommodate the condition in a safe manner. For example, block 1210 may begin with a predetermined travel plan (e.g., as received from another node, as developed in a collaborative effort with other nodes, etc.) and alter such plan based on real-time detected conditions.

The example method 1200 may, at block 1220, comprise implementing the travel plan. Block 1220 may comprise implementing the travel plan in any of a variety of manners, non-limiting examples of which are provided herein. For example, block 1220 may comprise implementing a timed sequence of defined movements of a mapped vehicle trajectory. Block 1220 may also, for example, comprise taking corrective actions if it is determined that the vehicle is not moving according to plan, if other vehicles or objects are not moving according to plan or positioned as planned, etc.

Block 1220 may, for example, may comprise communicating with other nodes (e.g., with a central controller, with other vehicles involved in a choreographed travel plan, etc.) during execution of a travel plan. For example, if a vehicle is not traveling according to plan (e.g., because of road conditions, because of a vehicle mechanical issue, etc.), the vehicle (or Mobile AP thereof, etc.) may communicate such deviation in real-time to other vehicles, for example as a warning to the other vehicles that the vehicle might not be in the planned position and/or traveling along the planned trajectory. The other vehicles may then, for example during their respective implementations of the travel plan, modify their travel appropriately (e.g., adjusting their trajectory to avoid the vehicle, stopping until the vehicle context is more clearly understood, stopping until a new travel plan is received from a central controller or intersection controller, stopping until a new travel plan is developed and agreed-upon by the relevant vehicles, etc.).

The example method 1200 may, at block 1230, comprise communicating information of the implemented travel plan. Block 1230 may comprise communicating the information in any of a variety of manners, non-limiting examples of which are provided herein.

Block 1230 may, for example, comprise communicating any or all information accessible to the node concerning the implementation of the travel plan. Such information may comprise any of a variety of types of information (e.g., vehicle trajectory information, camera sensor information, audio sensor information, any sensor information, information of communications between a vehicle and other vehicles or sensors, information from a vehicle's braking and/or accelerating system, information from a vehicle OBD system, information from an autonomous vehicle control system, information received from other vehicles, etc.). The information may, for example, comprise any or all of the types of information discussed herein with regard to block 1120 of the example method 1100 of FIG. 11. The information may, for example, comprise information indicating that a vehicle is deviating from a vehicle travel plan and/or information indicating why the vehicle has or is going to deviate from the vehicle travel plan (e.g., information of road conditions, obstacles detected, traffic control system communications or signals, communications with other vehicles involved (and/or not involved) with implementing the vehicle travel plan, sensor signals, vehicle control signals (e.g., OBD signals, etc.), actual vehicle trajectory information (e.g., position, velocity, path, etc.) for the vehicle and/or other vehicles, etc.

Block 1230 may comprise communicating the information to any one or more of a variety of destinations (e.g., to a central controller, to a Cloud server, to a Cloud database, to one or more vehicles, to one or more APs, etc.). Block 1230 may comprise communicating the information via any one or more of a variety of communication pathways (e.g., via a vehicle communication network, via a cellular network, etc.).

As discussed herein, depending on the nature of the information and/or the results of the travel plan implemented at block 1220, block 1230 may comprise selecting an appropriate communication pathway and/or destination for the information. For example, in an example scenario in which the travel plan was implemented at block 1220 without significant incident, block 1230 may comprise determining to communicate and communicating the information via a vehicle network in a delay-tolerant manner (e.g., in an opportunistic manner over a Wi-Fi network when available, as a low-priority communication via the vehicle communication network, waiting until a vehicle has completed travel, etc.). Also for example, in an example scenario in which the travel plan implemented at block 1220 was associated with a collision, block 1230 may comprise determining to communicate and communicating the information via a fastest and/or most reliable link (e.g., cellular link, etc.). Note that the same information may be communicated via a plurality of different communication links (e.g., any one or more of the types of communication links discussed herein, etc.). Additionally for example, in an example scenario in which a near collision occurs, block 1230 may comprise determining to communicate and communicating the information in a fastest (or relatively fast) manner available via the vehicle communication network, but not utilizing the cellular network. Also for example, in an example scenario in which the travel plan was implemented according to plan, block 1230 may comprise determining to wait until a most cost-effective manner of communicating the information is available (e.g., waiting until the vehicle passes a Wi-Fi hotspot, waiting until the vehicle is plugged in and/or at a station at the end of the day, etc.).

The example method 1200 may, at block 1295, comprise continuing execution. For example, block 1295 may direct execution flow to any block, or portion thereof, of the example method 1200. Also for example, block 1295 may direct execution flow to any block, or portion thereof, of any example method discussed herein.

The example method 1200 may be implemented by any or all of the communication system nodes discussed herein. For example, the example method 1200 (or any portion thereof) may be implemented by a system on-board a vehicle (e.g., an autonomous vehicle control system, a Mobile AP, etc.). Also for example, the example method 1200 (or any portion thereof) may be implemented by Cloud server, a central traffic controller, a fleet traffic controller, a Network Controller, a Fixed AP, a Mobile AP, etc.

Figure 13:
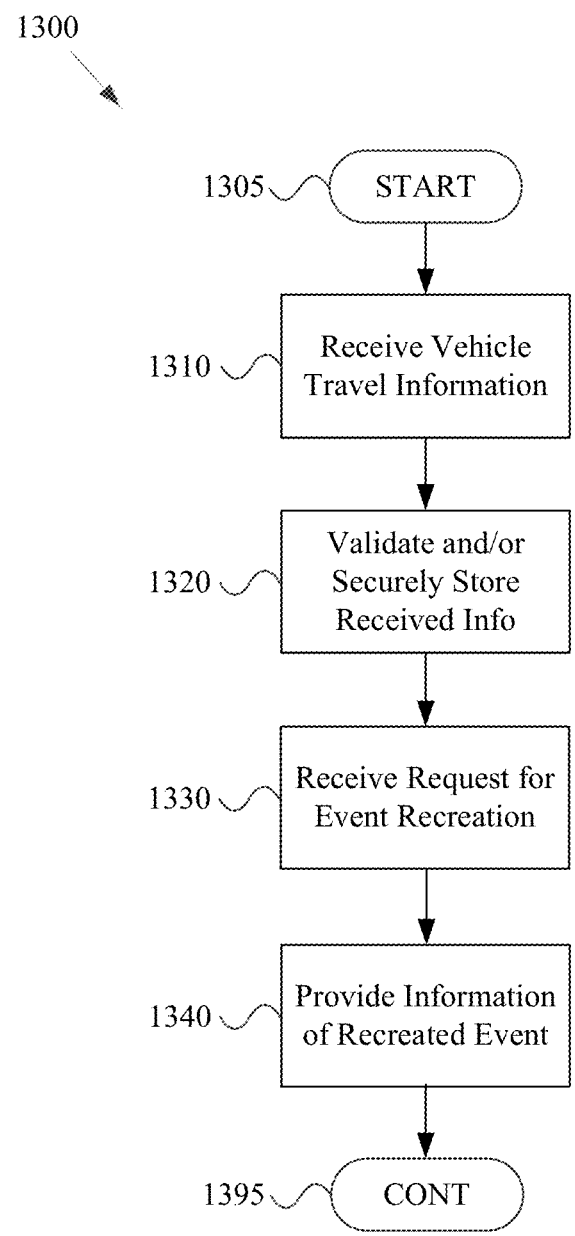
FIG. 13 shows a flow diagram of an example method for monitoring vehicle travel and recreating a vehicle travel event, in accordance with various aspects of the present disclosure.

FIG. 13 shows a flow diagram of an example method for monitoring vehicle travel and recreating a vehicle travel event, in accordance with various aspects of the present disclosure. The example method 1300 may, for example, share any or all characteristics with the other example methods, networks and/or network components 100, 200, 300, 400, 500-570, 600, 700, 800, 900, 1000, 1100, 1200, and 1400, discussed herein.

The example method 1300 begins executing at block 1305. The example method 1300 may begin executing in response to any of a variety of causes or conditions. For example, the example method 1300 may begin executing in response to a power-up or reset condition of a node implementing the method 1300 or any portion thereof. Also for example, the method 1300 may begin executing in response to a signal indicating that one or more vehicles have implemented a travel plan. Additionally for example, the method 1300 may begin executing in response to a message received from a vehicle (e.g., a vehicle control system thereof, Mobile AP of the vehicle, etc.) comprising information associated with a travel plan implemented by the vehicle. Further for example, the method 1300 may begin executing in response to a signal indicative of an emergency condition, a traffic jam, a time of day, a collision, a near collision, etc.). Also for example, the method 1300 may continually (or periodically) execute. The scope of the present disclosure should not be limited by characteristics of any particular initiating cause or condition.

The example method 1300 may, at block 1310, comprise receiving vehicle travel information. Block 1310 may comprise performing such receiving in any of a variety of manners, non-limiting examples of which are provided herein.

For example, block 1310 may share any or all characteristics with block 1120 of the example method 1100 of FIG. 11. Block 1310 may, for example, comprise receiving the information communicated at block 1230 of the example method 1200 of FIG. 12.

For example, block 1310 may comprise receiving information identifying vehicle travel movement of one or more or all of the vehicles involved in a vehicle travel plan. As discussed herein, such information may comprise vehicle ID information, location information, speed or velocity information, trajectory information, time information, sensor information, road condition information, weather information, audio and/or video information, vehicle control system information, vehicle OBD information, etc. Also for example, such information may comprise information regarding whether the vehicle did follow or intended to follow a vehicle travel (or movement) plan. In an example scenario in which the vehicle did not follow a vehicle travel plan (e.g., a previously agreed-upon travel plan, etc.), for example intentionally or unintentionally, the information may comprise information that caused the vehicle to deviate from the plan.

Block 1310 may comprise receiving the information via any of a variety of media and/or communication pathways. For example, block 1310 may comprise receiving the information via a vehicle communication network, via a cellular network, etc. Block 1310 may, for example, comprise communicating the information in a delay-tolerant manner, in a real-time manner, etc.

The example method 1300 may, at block 1320, comprise validating and securely storing (or handling) the information received at block 1310. Block 1320 may comprise performing such validating and/or storing in any of a variety of manners, non-limiting examples of which are provided herein.

For example, block 1320 may share any or all characteristics with block 1130 of the example method 1100 of FIG. 11.

For example, block 1320 may comprise validating the received information (e.g., via hash processing, decrypting, authenticating, etc.). Block 1320 may, for example, comprise encrypting and/or hashing such information, storing redundant copies of such information (e.g., at geographically distinct sites with different respective security protocols, etc.). Block 1320 may comprise storing such information in a database, where such information is linked (e.g., by event, by a vehicle travel plan, by time, by geographical location, etc.) in a manner in which the information is readily retrievable (e.g., for event recreation, etc.).

The example method 1300 may, at block 1330, comprise receiving a request for event recreation. Block 1330 may comprise receiving such request in any of a variety of manners, non-limiting examples of which are provided herein.

Block 1330 may comprise receiving the request from any of a variety of sources (e.g., a public safety organization, a traffic control organization, a court of law, an insurance company, etc.). The request may comprise any of a variety of characteristics. For example, the received request may comprise a request for all information associated with one or more particular vehicles, a request for all information associated with a particular intersection during a specified time window, etc. The request may, for example, comprise a sequence of one or more API commands. The request may, for example, be associated with block 1120 of the example method 1100 of FIG. 11 for information that may be utilized to analyze and/or modify a strategy for determining travel plans.

Block 1330 may comprise receiving the request via any of a variety of communication media. For example, block 1330 may comprise receiving the request via a vehicle communication network, via landline communication, via the Internet, via a cellular link, etc.

The request may also, for example, comprise a request for a recreated traffic event. For example, the request may comprise a request for recreated traffic activity at a specified intersection (or any location or geographical area of interest) during a specified time window. Also for example, the request may comprise a request for recreated travel trajectory for one or more specified vehicles during a specified time window.

The example method 1300 may, at block 1340, comprise providing information of a recreated event. Block 1340 may comprise providing such information in any of a variety of manners, non-limiting examples of which are provided herein.

For example, block 1340 may comprise providing a moving picture file (e.g., time-lapsed graphical representation) of the recreated event. Also for example, block 1340 may comprise providing a spreadsheet detailing vehicle and/or other object movement represented as a time progression. Additionally for example, block 1340 may comprise providing individually time-synchronized files of position for each known object during a time window.

Block 1340 may also, for example, comprise flagging (or highlighting or otherwise indicating) instances of vehicle deviation from a travel plan, for example comprising any or all information that may indicate why such deviation occurred (e.g., detected previously-unknown object or obstacle, vehicle failure condition, manual override, detected road condition, etc.). Block 1340 may additionally, for example, comprise flagging (or highlighting or otherwise indicating) instances of collision or near-collision.

The example method 1300 may, at block 1395, comprise continuing execution. For example, block 1395 may direct execution flow to any block, or portion thereof, of the example method 1300. Also for example, block 1395 may direct execution flow to any block, or portion thereof, of any example method discussed herein.

The example method 1300 may be implemented by any or all of the communication system nodes discussed herein. For example, the example method 1300 may be implemented by a Cloud server, a central traffic controller, a fleet traffic controller, a Network Controller, a Fixed AP, a Mobile AP, an autonomous vehicle control system, etc.

As explained herein, the functionality (e.g., vehicle action determination and/or implementation functionality, etc.) discussed herein may be performed in a single node, for example any or all of the nodes discussed herein, but may also be performed in a distributed manner in which respective portions of the functionality discussed herein are performed by respective nodes. A non-limiting example of a network and/or node implementation is provided at FIG. 14.

Figure 14:
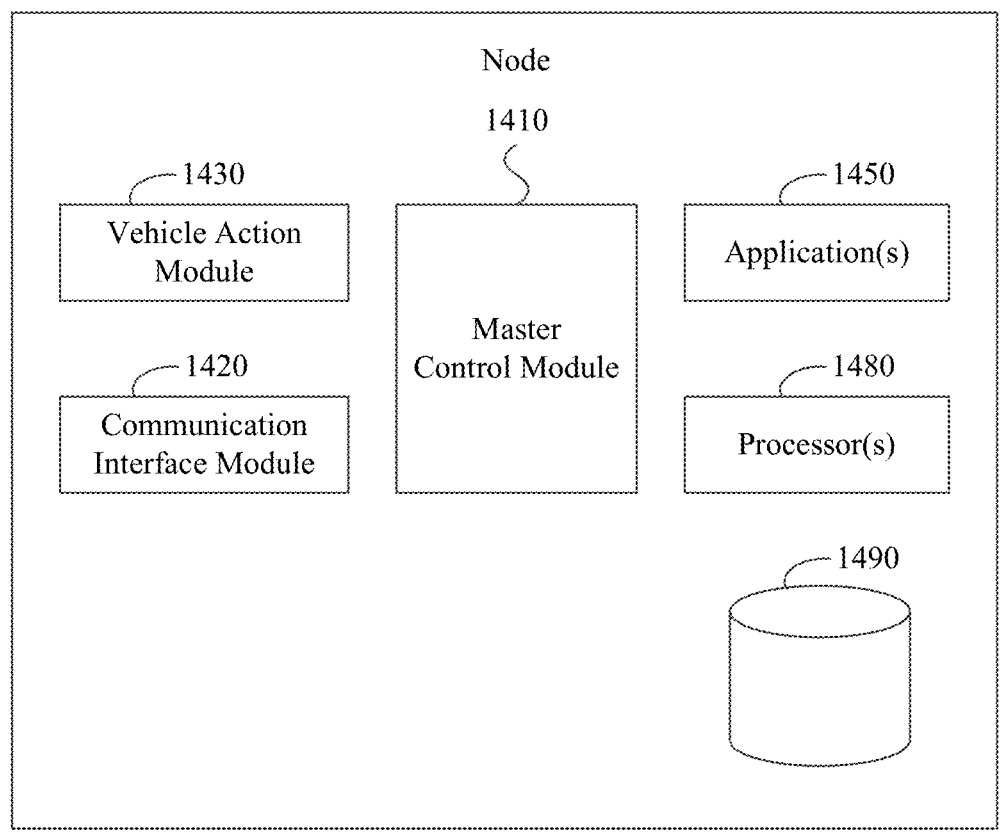
FIG. 14 shows a block diagram of an example network node, in accordance with various aspects of the present disclosure.

FIG. 14 shows a block diagram of various components of an example network node, in accordance with various aspects of the present disclosure. The example node 1400 may, for example, share any or all characteristics with the other example methods, networks and/or network components 100, 200, 300, 400, 500-570, 600, 700, 800, 900, 1000, 1100, 1200, and 1300, discussed herein. For example, any or all of the components of the example node 1400 may perform any or all of the method steps presented herein.

The network node 1400 may, for example, comprise any of the network nodes discussed herein, for example an access point (AP) node (e.g., a Mobile AP, a Fixed AP, etc.), a Network Controller, a Cloud server and/or database, a vehicle control system, etc. The example node 1400 may comprise a variety of components (or modules), non-limiting examples of which are provided herein. Note that any or all of the components (or modules) may be housed in a single housing, but such configuration is not required. For example, in an example implementation, components (or modules) associated with providing access point services may be housed in a first housing, and components (or modules) associated with controlling vehicle movement may be housed in a second housing that is communicatively coupled to the first housing.

The example node 1400 may, for example, comprise a communication interface (I/F) module 1420 (e.g., including a cellular communication interface module, mobile network communication interface module, Wi-Fi communication interface module, user/client communication interface module, etc.) that operates to perform any or all of the wireless and/or wired communication functionality for the node 1400, many examples of which are provided herein (e.g., communication with sensors external to (or of) the node 1400, communication with the onboard diagnostic (OBD) system of a vehicle in which the node 1400 is installed, communication with an autonomous vehicle control system of a vehicle in which the node 1400 is installed, communication with peer nodes, communication with Mobile APs and/or Fixed APs, communication with Network Controllers, communication with client devices, backhaul communication, Cloud server communication, etc.). The communication interface (I/F) module 1420 may, for example, operate in accordance with any of a variety of cellular communication protocols, 3G, 4G, LTE, wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), TCP/IP, etc.

The example node 1400 may, for example, comprise a vehicle action module 1430 that operates to perform any or all of the vehicle action functionality discussed herein. The example vehicle action module 1430 may, for example, comprise hardware and/or software that operate to implement any or all of the node's vehicle action control functionality discussed herein. For example, the vehicle action module 1430 may operate to perform any or all of the operations discussed herein in the discussion of FIGS. 8-13 and the other portions of the present disclosure.

The example node 1400 may, for example, comprise a Master Control Module 1410 that generally manages operation of the node 1400 at a high level. Such Master Control Module 1410 may, for example, comprise various aspects of an operating system for the node 1400.

The example node 1400 may further, for example, comprise one or more applications 1450 executing on the node 1400 (e.g., client management applications, security applications, power management applications, vehicle monitoring applications, location services applications, sensor interface applications, etc.).

The example node 1400 may also comprise one or more processors 1480 and memory devices 1490. The processor(s) 1480 may, for example, comprise any of a variety of processor characteristics. For example, the processor(s) 1480 may comprise one or more of a general purpose processor, RIS processor, microcontroller, ASIC, DSP, video processor, etc.). The memory device(s) 1490 may, for example comprise any of a variety of memory characteristics. For example, the memory device(s) 1490 may comprise a volatile memory, non-volatile memory, etc. The memory device(s) 1490 may, for example, comprise a non-transitory computer-readable (or machine-readable) medium that comprises software instructions that when executed by the processor(s) 1480, cause the node 1400 (or modules or entities thereof) to perform any or all of the functionality discussed herein (e.g., with regard to the example methods discussed herein, etc.). The memory device(s) 1490 may, for example, store node information (e.g., CNL information, Wi-Fi hotspot list information, NIB information, configurable cost function information, etc.). The memory device(s) 1490 may also, for example, store any or all of the context information discussed herein (e.g., vehicle context information, intersection context information, etc.). The memory device(s) 1490 may additionally, for example, store any or all of the information discussed herein regarding vehicle travel (or trajectory) actions to take, actions taken, etc.

As explained herein, the functionality (e.g., vehicle action determination and/or implementation functionality, etc.) discussed herein may be performed in a single node, for example any or all of the nodes discussed herein, but may also be performed in a distributed manner in which respective portions of the functionality discussed herein are performed by respective nodes.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270, 678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide systems and methods for tracking and/or fault detection in a network of moving things. As non-limiting examples, various aspects of this disclosure provide systems and methods for tracking vehicles (e.g., autonomous vehicles, manually controlled vehicles, etc.) and/or performing fault detection of a network of moving things. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A system for tracking and controlling road actions in a vehicle communication network, the system comprising:
   a node of a vehicle communication network, the node comprising:
   at least one network transceiver;
   at least one module, comprising at least a processor and a memory, operable to at least:
   utilize the at least one network transceiver to communicate with mobile access points (MAPs) of the vehicle communication network;
   develop, utilizing a vehicle travel plan development strategy, a vehicle travel plan for a vehicle associated with a MAP, the vehicle travel plan describing road actions that the vehicle is to implement;
   utilize the at least one network transceiver to communicate the vehicle travel plan to the MAP;
   receive from the MAP, information describing the vehicle's implementation of the vehicle travel plan; and
   store the received information; and
   a mobile access point (MAP) of the vehicle communication network, the mobile access point comprising:
   at least one wireless transceiver;
   at least one module, comprising at least a processor and a memory, operable to at least:
   utilize the at least one wireless transceiver to communicate with other mobile access points and fixed access points of the vehicle communication network;
   determine, as a vehicle associated with the MAP travels, a vehicle travel plan for the vehicle, the vehicle travel plan describing road actions that the vehicle is to implement;
   during and/or after implementation of the vehicle travel plan by the vehicle, communicate information to the node describing the implementation of the vehicle travel plan by the vehicle.

2. The system of claim 1, wherein the at least one module of the node is operable to analyze the received information to determine whether to modify the vehicle travel plan development strategy.

3. The system of claim 1, wherein the information describing the implementation of the vehicle travel plan by the vehicle comprises information indicating that the vehicle deviated from the vehicle travel plan.

4. The system of claim 1, wherein the at least one module of the MAP is operable to determine a manner in which to communicate the information to the node, and to communicate the information to the node in the determined manner.

5. The system of claim 1, wherein the at least one module of the node is operable to determine whether to modify the vehicle travel plan development strategy based, at least in part, on whether the received information indicates that the vehicle deviated from the vehicle travel plan.

6. The system of claim 1, wherein the at least one module of the node is operable to determine whether to modify the vehicle travel plan development strategy based, at least in part, on whether the received information indicates that the implementation of the vehicle travel plan by the vehicle resulted in a significant traffic event.

7. A mobile access point (MAP) of a vehicle communication network, the mobile access point comprising:
at least one wireless transceiver;
at least one module, comprising at least a processor and a memory, operable to at least:
utilize the at least one wireless transceiver to communicate with other mobile access points of the vehicle communication network;
utilize the at least one wireless transceiver to communicate with fixed access points of the vehicle communication network;
utilize the at least one wireless transceiver to provide wireless local area network (WLAN) connectivity to client nodes of the mobile access point;
determine, as a vehicle associated with the MAP travels, a vehicle travel plan for the vehicle, the vehicle travel plan describing road actions that the vehicle is to implement;
during and/or after implementation of the vehicle travel plan by the vehicle, communicate implementation information to another node describing the implementation of the vehicle travel plan by the vehicle.

8. The mobile access point of claim 7, wherein the at least one module is operable to determine the vehicle travel plan by, at least in part, operating to receive at least a portion of the vehicle travel plan from another node of the vehicle communication network.

9. The mobile access point of claim 7, wherein, during implementation of the vehicle travel plan by the vehicle, the at least one module is operable to communicate information with one or more other MAPs indicating that the vehicle is deviating from the vehicle travel plan.

10. The mobile access point of claim 7, wherein the implementation information comprises information indicating that the vehicle deviated from the vehicle travel plan.

11. The mobile access point of claim 10, wherein the information indicating that the vehicle deviated from the vehicle travel plan comprises information indicating why the vehicle deviated from the vehicle travel plan.

12. The mobile access point of claim 10, wherein the information indicating that the vehicle deviated from the vehicle travel plan comprises vehicle trajectory information for the vehicle and for one or more other vehicles.

13. The mobile access point of claim 7, wherein the at least one module is operable to determine a manner in which to communicate the implementation information to the node by, at least in part, operating to determine whether to communicate the implementation information to the other node immediately or in a delay-tolerant manner.

14. The mobile access point of claim 7, wherein the at least one module is operable to determine a manner in which to communicate the implementation information to the node by, at least in part, operating to select a communication network of a plurality of communication networks through which to communicate the implementation information.

15. The mobile access point of claim 14, wherein the plurality of communication networks comprises the vehicle communication network and a cellular communication network.

16. The mobile access point of claim 7, wherein the at least one module is operable to determine a manner in which to communicate the implementation information to the node based, at least in part, on whether implementation of the vehicle travel plan by the vehicle resulted in a significant traffic event.

17. The mobile access point of claim 16, wherein the significant traffic event comprises a collision, a near collision, and/or a traffic flow disruption.

18. A node of a vehicle communication network, the node comprising:
at least one network transceiver;
at least one module, comprising at least a processor and a memory, operable to at least:
utilize the at least one network transceiver to communicate with mobile access points (MAPs) of the vehicle communication network;
develop, utilizing a vehicle travel plan development strategy, a vehicle travel plan for a vehicle associated with a MAP, the vehicle travel plan describing road actions that the vehicle is to implement;
utilize the at least one network transceiver to communicate the vehicle travel plan to the MAP;
receive from the MAP, information describing the vehicle's implementation of the vehicle travel plan; and
analyze the received information to determine whether to modify the vehicle travel plan development strategy.

19. The node of claim 18, wherein the at least one module is operable to determine whether to modify the vehicle travel plan development strategy based, at least in part, on whether the received information indicates that the vehicle deviated from the vehicle travel plan.

20. The node of claim 18, wherein the at least one module is operable to determine whether to modify the vehicle travel plan development strategy based, at least in part, on whether implementation of the vehicle travel plan resulted in a significant traffic event.

21. The node of claim 20, wherein the significant traffic event comprises a collision, a near collision, and/or a traffic flow disruption.

22. The node of claim 18, wherein the received information comprises information indicating why the vehicle deviated from the vehicle travel plan.

23. The node of claim 22, wherein the information indicating why the vehicle deviated from the vehicle travel plan comprises information describing at least one unexpected condition that caused the vehicle to deviate from the vehicle travel plan.

24. The node of claim 18, wherein the at least one module is operable to modify the vehicle travel plan development strategy to account for:
a road condition that was previously not accounted for in the travel plan development strategy; and/or
an object that was previously not accounted for in the travel plan development strategy.

25. The node of claim 18, wherein the at least one module is operable to modify the vehicle travel plan development strategy by, at least in part, operating to increase a target separation between vehicles.

26. The node of claim 18, wherein the at least one module is operable to modify the vehicle travel plan development strategy by, at least in part, operating to modify a weight assigned to a cost function parameter of the travel plan development strategy.

27. The node of claim 18, wherein the at least one module is operable to modify the vehicle travel plan development strategy by, at least in part, operating to add or remove a factor from consideration by the travel plan development strategy.

28. The node of claim 18, wherein the node comprises an access point of the vehicle communication network.

\* \* \* \* \*